US00RE42881E

(19) United States
(12) Reissued Patent
Vallmajo et al.

(10) Patent Number: US RE42,881 E
(45) Date of Reissued Patent: Nov. 1, 2011

(54) METHOD AND SYSTEM FOR SCANNING IMAGES IN A PHOTO KIOSK

(75) Inventors: Patrice Vallmajo, Antibes (FR); Phillippe Joseph Ghislain Bossut, Portolla Valley, CA (US)

(73) Assignee: Intellectual Ventures I LLC, Wilmington, DE (US)

(21) Appl. No.: 11/521,620

(22) Filed: Sep. 13, 2006

Related U.S. Patent Documents

Reissue of:
(64) Patent No.: 6,791,723
Issued: Sep. 14, 2004
Appl. No.: 09/271,030
Filed: Mar. 17, 1999

U.S. Applications:
(63) Continuation-in-part of application No. 09/151,437, filed on Sep. 11, 1998, now Pat. No. 6,750,988.

(51) Int. Cl.
*H04N 1/04* (2006.01)
*H04N 1/46* (2006.01)
*G06K 9/52* (2006.01)
*G06K 9/36* (2006.01)

(52) U.S. Cl. ..... 358/488; 358/474; 358/444; 358/452; 358/453; 358/505; 382/199; 382/206; 382/260; 382/289

(58) Field of Classification Search ..... 358/488, 358/486, 478, 401, 444, 452, 453, 464, 465, 358/448, 296, 506, 505; 382/199, 289, 195, 382/206, 205, 286, 319, 318, 260, 266, 283, 382/282, 294–296
See application file for complete search history.

(56) References Cited

U.S. PATENT DOCUMENTS

| | | | | |
|---|---|---|---|---|
| 5,555,042 | A | 9/1996 | Jones et al. | |
| 5,623,581 | A | 4/1997 | Attenberg | |
| 5,913,019 | A | 6/1999 | Attenberg | |
| 6,049,636 | A * | 4/2000 | Yang | 382/289 |
| 6,111,667 | A * | 8/2000 | Mishima et al. | 358/488 |
| 6,369,908 | B1 | 4/2002 | Frey et al. | |
| 6,597,808 | B1 * | 7/2003 | Guo et al. | 382/173 |
| 6,750,988 | B1 | 6/2004 | Ghislain Bossut et al. | |
| 6,791,723 | B1 | 9/2004 | Vallmajo et al. | |
| 2010/0104194 | A1 * | 4/2010 | Suzuki | 382/195 |

OTHER PUBLICATIONS

Eastman Kodak Company, "Eliminating Red-Eye," http://www.kodak.com/cluster/global/en/service/faqs/faq0012.shtml, Sep. 7, 1998.
"IBM/Delphi Photo Kiosk," http://www.ratio.com/p_photo.htm, Sep. 7, 1998.
William K. Pratt, "Digital Image Processing," ISBN:0471857661, 1991, pp. 491-556, John Wiley & Sons, Inc.

* cited by examiner

*Primary Examiner* — Cheukfan Lee
(74) *Attorney, Agent, or Firm* — Perkins Coie LLP

(57) ABSTRACT

A method and system for determining the orientation of an image of a picture within a scanned image, including the steps of locating in the scanned image the contour of the image of the picture, determining a plurality of bounding boxes confining the contour of the image of the picture, selecting one of the plurality of bounding boxes that is substantially aligned with the contour of the image of the picture, and calculating an angle of rotation of the picture based on the selected bounding box.

64 Claims, 9 Drawing Sheets

925

METHOD AND SYSTEM FOR SCANNING IMAGES IN A PHOTO KIOSK

Matter enclosed in heavy brackets [ ] appears in the original patent but forms no part of this reissue specification; matter printed in italics indicates the additions made by reissue.

This is a continuation-in-part of application U.S. Ser. No. 09/151,437, filed on Sep. 11, 1998, *now U.S. Pat. No. 6,750, 988*, entitled "A Method and System for Scanning Images in a Photo Kiosk."

FIELD OF THE INVENTION

The present invention relates to scanning images in a photo kiosk.

BACKGROUND OF THE INVENTION

Photo kiosks are booths containing hardware or software for creating image content. A consumer can, for example, place a picture in the kiosk, have the picture digitized to a digital image, edit the digital image and print the edited image on various forms of paper output. Some photo kiosks provide pre-designed templates into which a consumer can place his own pictures.

Some photo kiosks contain a scanner unit for converting a picture to a digital image. Typically the scanner unit in such a photo kiosk is a flat bed scanner.

Flat bed scanners are used to convert pictures to digital images by digitizing picture colors at sample locations within a fine two-dimensional spatial grid. Such scanners are typically operated by positioning a picture to be scanned on a glass surface of the flat scanner bed, closing the scanner bed cover over the glass surface, and then scanning a region of the scanner bed by means of scanning units located underneath the scanner bed. Flat bed scanners are typically connected to computers and operated using software applications.

A picture to be scanned may occupy only a small part of the full scanner bed area. In order not to scan the full scanner bed area, but rather to scan only a smaller area containing the picture, one can first apply a very low resolution pre-scan to the entire scanner bed area, and then use the pre-scanned digital image to set scanner parameters and select a suitable region of interest surrounding the picture. Such a low-resolution scan can be at a resolution of approximately 24 dots per inch (dpi), which corresponds to approximately 1 pixel per millimeter.

A high resolution scan is costly both in time spent scanning and in scanned image file size. If one were to scan the entire scanner bed area with a high resolution scan, most of the time spent and most of the image data could pertain to the empty part of the scanner bed that does not contain the picture. Moreover if scanner parameters, such as color look-up tables and contrast, are not set properly, the scan may have to be repeated. A pre-scanned digital image can be used to set scanner parameters, and also to select a region of interest that surrounds the picture. By setting the scanner parameters in this way and selecting a region of interest, one ensures that the high resolution scan captures only a sub-area of the entire scanner bed area that contains the picture within it, and that the scanner parameters are properly set before performing the high resolution scan.

In photo kiosks that contain scanners, the scanner unit is typically located inside the kiosk. The consumer may not be able to see the scanner. He may not be able to control the scanner settings, and he may not even be able to view a pre-scanned image. Moreover, even if it were possible to provide such control, it would only serve to complicate the operation of a photo kiosk, thereby frustrating and distancing potential consumers who may have very little or no experience with scanner devices.

SUMMARY OF THE INVENTION

There is provided in accordance with a preferred embodiment of the present invention a method for operating a photo kiosk having a scanner therein, including positioning a user-provided picture on a scanner bed of the kiosk scanner in an arbitrary orientation relative to the scanner bed, and automatically determining the orientation of the picture by pre-scanning, using the kiosk scanner, at least an area of the scanner bed having the picture positioned therein at a low resolution, to produce a pre-scanned image, and scanning, using the kiosk scanner, an area of the scanner bed at a high resolution to provide a photo product having an image of the picture in a desired orientation therein irrespective of the picture's orientation relative to the scanner bed.

There is also provided in accordance with a preferred embodiment of the present invention a method for determining the orientation of an image of a picture within a scanned image for use within a photo kiosk having a scanner therein, including the steps of positioning a user-provided picture on a scanner bed of the kiosk scanner in an arbitrary orientation relative to the scanner bed, scanning, using the kiosk scanner, a preliminary region of the scanner bed having the picture positioned therein, to produce a preliminary scanned image containing an image of the picture, determining a plurality of bounding boxes confining the image of the picture within the preliminary scanned image, selecting one of the plurality of bounding boxes confining the image of the picture, and calculating an angle of rotation of the picture based on the selected bounding box.

There is also provided in accordance with a preferred embodiment of the present invention a system for scanning pictures within a photo kiosk, including a kiosk scanner having a kiosk scanner bed for positioning a picture thereon in an arbitrary orientation relative to the kiosk scanner bed, and a kiosk processor automatically determining the orientation of the picture by pre-scanning, using the kiosk scanner, at least an area of the kiosk scanner having the picture positioned therein at a low resolution to produce a pre-scanned image, and scanning, using the kiosk scanner, an area of the scanner bed at a high resolution to provide a photo product having an image of the picture in a desired orientation thereon irrespective of the picture's orientation relative to the scanner bed.

There is also provided in accordance with a preferred embodiment of the present invention a system for determining the orientation of an image of a picture within a scanned image for use within a photo kiosk, including a kiosk scanner having a kiosk scanner bed for positioning a picture thereon in an arbitrary orientation, a kiosk processor determining a plurality of bounding boxes confining an image of the picture within a preliminary scanned image, a selector selecting one of the plurality of bounding boxes confining the image of the picture, and an image processor calculating an angle of rotation of the picture based on the selected bounding box.

There is also provided in accordance with a preferred embodiment of the present invention a photo kiosk, including a scanner having a scanner bed for positioning a picture thereon in an arbitrary orientation, and apparatus for determining a bounding box confining an image of the picture within a pre-scanned image, the pre-scanned image being produced by pre-scanning an area of the scanner bed having the picture positioned thereon, and the bounding box having edges parallel to the borders of the scanner bed.

There is also provided in accordance with a preferred embodiment of the present invention a photo kiosk, including a scanner having a scanner bed for positioning a picture thereon in an arbitrary orientation, and apparatus for determining the orientation of an image of the picture within a preliminary scanned image, the preliminary scanned image being produced by pre-scanning an area of the scanner bed having the picture positioned thereon.

There is also provided in accordance with a preferred embodiment of the present invention a method for determining the orientation of an image of a picture within a scanned image, including the steps of locating in the scanned image a contour of the image of the picture, determining a plurality of bounding boxes confining the contour of the image of the picture, selecting one of the plurality of bounding boxes that is significantly aligned with the contour of the image of the picture, and calculating an angle of rotation of the picture based on the selected bounding box.

There is also provided in accordance with a preferred embodiment of the present invention a method for operating a scanner, including detecting that a user has placed a plurality of pictures in arbitrary orientations on a scanner bed of the scanner, scanning the plurality of pictures to generate a scanned image containing a plurality of images of the pictures, and automatically determining an orientation of at least one of the images of the pictures relative to the scanner bed using the scanned image.

There is also provided in accordance with a preferred embodiment of the present invention a system for determining the orientation of an image of a picture within a scanned image, including an image processor locating in the scanned image a contour of the image of the picture, a box generator determining a plurality of bounding boxes confining the contour of the image of the picture, a box processor selecting one of the plurality of bounding boxes that is significantly aligned with the contour of the image of the picture, and an angle processor calculating an angle of rotation of the picture based on the selected bounding box.

There is also provided in accordance with a preferred embodiment of the present invention a system for scanning pictures, including a scanner generating a single scanned image from a plurality of pictures, the single scanned image containing a plurality of images of the pictures, a scanner bed within said scanner on which are located a plurality of pictures in arbitrary orientations, and a processor automatically determining the orientation of at least one of the images of the pictures using the single scanned image.

DESCRIPTION OF THE DRAWINGS

The present invention will be more fully understood and appreciated from the following detailed description, taken in conjunction with the drawings in which.

DESCRIPTION OF A PREFERRED EMBODIMENT

In a photo kiosk operating environment it is necessary to perform the setting of parameters and selection of a region of interest completely automatically, without any manual intervention, using a low-resolution pre-scanned digital image. Specifically, a picture is positioned on a scanner bed in an arbitrary orientation either by a user or by an automatic feeder, and the photo kiosk should automatically select a region of interest. Herein, an arbitrary orientation refers to a non-predetermined orientation that may be any one of a continuous range of orientations. For example, the picture need not be positioned flush with any border of the scanner bed, and need not even be situated in parallel alignment to the borders of the scanner bed. That is, the picture may be positioned anywhere within the area of the scanner bed and may be rotated relative to the borders of the scanner bed.

Figure 1B:
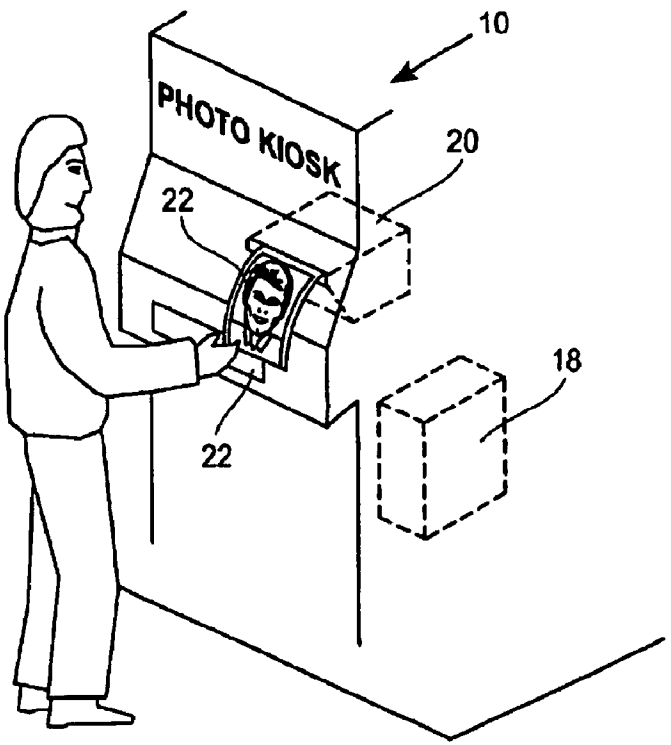
FIGS. 1A and 1B are simplified illustrations of a photo kiosk having a scanner therein, operating in accordance with a preferred embodiment of the present invention to properly orient a picture that is placed on the scanner in an arbitrary orientation.
Figure 1A:
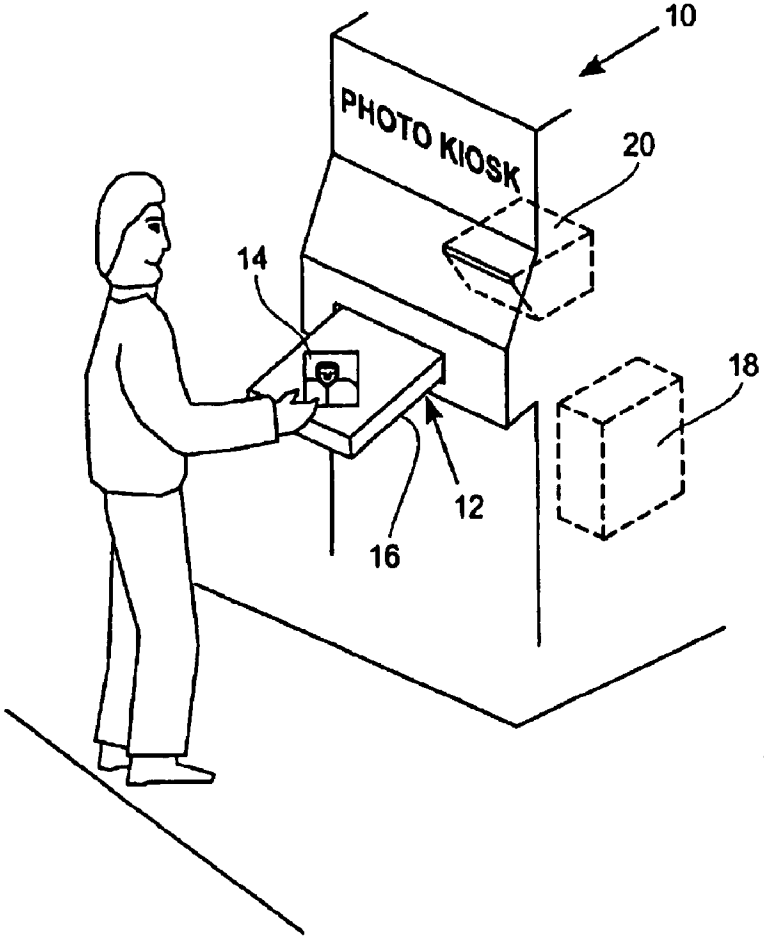

Reference is now made to FIGS. 1A and 1B, which are simplified illustrations of a photo kiosk 10 having a scanner 12 therein, operating in accordance with a preferred embodiment of the present invention to determine the orientation of a picture 14 that is placed on scanner 12 in an arbitrary orientation. The photo kiosk 10 shown in FIG. 1A and FIG. 1B has a protruding slideable scanner bed 16, for placing picture 14 thereon, a kiosk processor 18 for carrying out digital image manipulations, and a printer device 20 for outputting photo products, such as a poster, personalized stationary, business cards, invitations or a calendar.

In addition to producing hard copy photo products, a photo kiosk may also provide a consumer with the capability of receiving an electronic (i.e. soft) copy of his photo product. Moreover, a photo kiosk may operate within a computer network, enabling a consumer to upload an electronic image to the photo kiosk for processing.

As seen in FIG. 1A, a user places picture 14 on protruding slideable scanner bed 16 in an arbitrary orientation. The placement of picture 14 need not be flush with any border of scanner bed 16, nor in parallel alignment with borders of scanner bed 16. After the scanner bed 16 slides back into kiosk 10, scanner 12 operates to digitize picture 14. In an alternate embodiment, scanner 12 may include an automatic feeder (not shown) that accepts picture 14 from the user and feeds picture 14 into position on scanner bed 16 in an arbitrary orientation. In either embodiment, after scanner 12 operates to digitize picture 14, kiosk software or hardware operating in accordance with a preferred embodiment of the present invention calculates the orientation of picture 14 on scanner bed 16.

In FIG. 1B kiosk 10 uses the calculated orientation information to correctly adjust the alignment of the displayed picture with respect to the horizontal and vertical axes of the kiosk display; i.e. X and Y axes defined by the borders of scanner bed 16. When the user prints a photo product 22, an image of the picture 14 is properly aligned therein.

An approach that may come to mind for automatically selecting a region of interest surrounding a picture in a pre-scanned digital image, is to look for a constant color background where only the scanned scanner cover is present, but not the picture. However, scanner covers are often made of material that does not reflect a constant color, and may give rise to complicated patterns when scanned. In addition, there may be fine scratches in the glass surface of the scanner bed, or fine patterns in the surface of the scanner cover, and these can show up as faint edges in the scanned image. As a result, the background where only the scanned cover has been scanned may not have a constant color, and may even have a complicated coloration pattern. As such, it may not be readily discernible by an automated processor.

Overview

The present specification describes a method and system for automatically identifying an accurate region of interest surrounding a picture from a pre-scanned digital image, without manual intervention. The present specification further describes a method for determining an angle of orientation of the picture relative to the borders of the scanner bed, also without manual intervention. The angle of orientation can be used to later correct the scanned image for a positioning of the picture on the scanner bed that was not aligned with the directions of the borders of the scanner bed.

As used herein, the term "pixel" denotes an element of a digital image. A pixel has both a location, referred to as the pixel location, and a color, referred to as the pixel color. The pixel color is characterized by a pixel color value, which is typically a triplet of three individual color channel values, such as red (R), green (G) and blue (B). The R, G and B values may be 8-bit integer values ranging from 0 to 255. Many other well-known color spaces may also be used, and color channels may also have precisions other than 8 bits.

As used herein, the term "picture" denotes an object placed on the surface of a scanner bed to be converted to a digital image by scanning. Pictures include drawings, photographs, document pages, three-dimensional objects such as a book, and more.

The "angle of orientation" referred to herein can be either the orientation of the picture relative to the scanner bed, or the orientation of the subject matter within the picture relative to the scanner bed. In particular, preferred embodiments of the present invention can be used to correct for positioning of the picture that was not aligned with the borders of the scanner bed, or for positioning of the subject matter within the picture that was not aligned with the borders of the picture, or for a combination of both.

In the ensuing discussion it is assumed that scanlines in the scanned image are parallel to a border of the scanner bed. That is, the scanning units of the scanner scan each of a succession of lines (scanlines) in a direction that is parallel to one border of the scanner bed, and each successive scanline is offset from its neighboring scanline in a scanline offset direction that is perpendicular to the scanline direction. If scanlines in the scanned image are not parallel to a border of the scanner bed, then the present invention as described hereinbelow determines an angle of rotation of the picture relative to the scanline and scanline offset directions. The scanline and scanline offset directions are the principal directions, since they correspond to the directions of the horizontal and vertical axes of the kiosk display. Typically the scanline and scanline offset directions are aligned with the directions of the borders of the scanner bed, which is assumed to be the case in the description hereinbelow.

The present invention operates in two stages, the first stage being the determination of a region of interest and the second stage being the determination of an angle of rotation. The first stage, determining a region of interest, is carried out by performing a low resolution pre-scan of the entire scanner bed, and then using the resulting pre-scanned digital image to determine a region of interest. The region of interest is then used to limit the scanning area for performing a high-resolution scan and generating a high-resolution scanned digital image.

For carrying out the second stage; namely, determining an angle of rotation, the present specification describes two embodiments—a "variable box size" embodiment, and "fixed box size" embodiment. Both embodiments operate by generating boxes at various angles of rotation that surround the picture within the scanned image, and determining which box is "most aligned" with the picture, as described in detail hereinbelow.

For lack of information at the outset, the low resolution pre-scanned image is used for the first stage of determining a region of interest. Thereafter, either the low resolution pre-scanned image or the high-resolution scanned image can be used for the second stage of determining the angle of rotation. That is, the variable box size embodiment can be carried out using either the low resolution pre-scanned image, or the high resolution scanned image, and similarly the fixed box size embodiment can be carried out using either the low resolution pre-scanned image or the high-resolution scanned image.

The choice of whether to use the low resolution pre-scanned image or the high resolution scanned image should take into consideration the pros and cons of each. Use of the low resolution pre-scanned image has the advantage of being faster to process, but less accurate. Use of the high resolution image has the advantage of being more accurate, but slower to process.

For purposes of clarification and for the sake of definiteness, the ensuing discussion is presented for embodiments in which the low resolution pre-scanned image is used for the variable box size embodiment, and the high resolution scanned image is used for the fixed box size image.

Determining a Region of Interest

In a preferred embodiment of the present invention, determining a region of interest involves three or more steps. The first step is to pre-scan the scanner bed at a low resolution, to obtain a pre-scanned digital image. The second step is to identify the "significant" edges within the pre-scanned image, as described in detail hereinbelow. The third step is to determine a region of interest that encompasses all of the significant edges, is aligned with the scanner bed and is as small as possible, as described in detail hereinbelow. Once a region of interest is determined, a high resolution scan is performed within the area of the region of interest. An optional fourth step is to use the high resolution scanned image to refine the region of interest calculated in step three. The refined region of interest is not typically used to delimit another high resolution scan, but is rather used to crop the picture within the scanned image for displaying the picture on a kiosk display.

In a preferred embodiment, the present invention carries out the second step above by applying an edge filter to the pre-scanned image, so as to detect the edges therein. Edge filters use gradients in pixel luminance values to detect edges. Luminance is an achromatic value representing the light intensity of a color. Luminance, L, is related to the red (R), green (G) and blue (B) color channels by the approximate linear relationship L=0.299*R+0.587*G+0.114*B. Human perception of edges relies on abrupt changes in luminance values; i.e. large gradients in these values.

The following computer listing of software in the C++ programming language calculates the luminance values of an input image array, named "image," and stores the luminance values in a floating point output array buffer→intensity. It also generates luminance values at pixel locations within strips of pixel locations that extend one pixel beyond the image dimensions, for the purpose of computing a 3×3 filter, as described hereinbelow. The actual luminance value calculation is performed within an inline function LUMINANCE.

```
bool PSmartScanLowRes::ComputeLuminance(const N
  PixelBufferMgr& image, PProcessBuffers*
buffer)
{
register uint32 pix=0;
register uint32 column=0;
register uint32 columnmax=width;
register uint32 row=0;
register uint32 rowmax=height;
if (!buffer→IsIntensityMap Valid( )) return false;
for (row=0; row<rowmax; row++)
{
  for (column=0; column<columnmax; column++)
  {
  pix=uint32(image.Row(row)[column]);
  buffer→intensity[row+1][column+1]=LUMINANCE
    (pix);
  }
}
for (column=0; column<columnmax+2; column++)
{
  buffer→intensity[0][column]=buffer→intensity[1]
[column];
  buffer→intensity[rowmax+l][column]=buffer→
intensity[rowmax][column];
}
for (row=0; row<rowmax+2; row++)
{
  buffer→intensity[row][0]=buffer→intensity[row][1];
  buffer→intensity[row][columnmax+1]=buffer→
intensity[row][columnmax];
}
return true;
inline bool PProcessBuffers::IsIntensityMapValid(void)
  const
{return (intensity !=0); }
```

A general reference for edge filters is Pratt, William K., "Digital Image Processing," ISBN: 0471857661, published by John Wiley & Sons (hereinafter "Pratt"), the contents of which are hereby incorporated by reference.

An example of an edge filter is the familiar Sobel filter. In a preferred embodiment of the present invention a 3×3 Sobel filter with a vertical gradient direction is used for edge detection in the low resolution pre-scanned image. Such a filter uses a 3×3 convolution with a two-dimensional matrix $$\begin{bmatrix} 1 & 1 & 1 \\ -2 & -2 & -2 \\ 1 & 1 & 1 \end{bmatrix}.$$

Restricting to the vertical gradient direction has the advantage of reducing the computational time, and the disadvantage of not detecting strictly vertical edges. Non-vertical edges are detected, however. Since the Sobel filter is used for determining a bounding box of the picture, and since a box that bounds all non-vertical edges of a picture will also bound the picture's vertical edges (except in the unlikely circumstance where the picture has vertical lines around its border), the limitation of restricting to vertical gradient directions is acceptable.

In an alternate embodiment, a horizontal gradient filter may be used to perform the edge detection instead of a vertical gradient filter. In yet another alternate embodiment, both horizontal and vertical gradient filters may be used to perform the edge detection.

As indicated in the software listing above, in order to be able to apply a 3×3 filter at border pixels of the pre-scanned image, luminance values are provided in an additional strip of pixels surrounding the pre-scanned image, the additional strip having a width of 1 pixel. In one embodiment, the luminance values outside of the pre-scanned image are determined by mirroring; i.e. setting each such value to the luminance value of the closest pixel thereto within the pre-scanned image. Other techniques, such as pixel value extrapolation or averaging, may be used to determine luminance values for the pixels in the strip surrounding the pre-scanned image in alternate embodiments.

The following computer listing of software in the C++ programming language implements the 3×3 Sobel filter described above in a method named ComputeSobel3×3. The luminance values for the pre-scanned image are stored in a floating point array buffer→intensity, and the resulting edge values are stored in a floating point array buffer→gradient. It is noted that it is the absolute values of the filter values that are being stored in buffer→gradient.

```
bool PSmartScanLowRes::ComputeSobel3×3
  (PProcessBuffers*buffer)
register uint32 row=0;
register uint32 column=0;
register float*gradient_ptr=0;
register uint32 rowmax=height;
register uint32 columnmax=width;
if (!buffer→IsIntensityMapValid( )      ||
  !buffer→IsGradientMapValid( )) return false;
for (gradient_ptr=buffer→gradient, row=1; row<rowmax+
  1; row++)
{
  for (column=1; column<columnmax+1; column++,
gradient_ptr ++)
  {
  (*gradient_ptr)=float(buffer→intensity[row−1]
    [column−1]+
    buffer→intensity[row][column−1]+
```

-continued

```
        buffer→intensity[row+1][column−1]+
        buffer→intensity[row−1][column+1]+
        buffer→intensity[row][column+1]+
        buffer→intensity[row+1][column+1]−
        (buffer→intensity[row][column]+
        buffer→intensity[row−1][column]+
        buffer→intensity[row+1][column])*
float(2.0));
   if (*gradient_ptr <0)*gradient_ptr=−*gradient_ptr;
   }
}
return true;
inline bool PProcessBuffers::IsGradientMapValid(void)
   const
{return (gradient !→=0); }
```

The result of an edge filter operation is an edge map, which is a monochrome image having gray-scale edge values at the pixel locations of the pre-scanned image, each edge value corresponding to the presence or absence of an edge at a pixel location, and the strength of such an edge. The stronger the edge at a given pixel location, the darker the edge value at that location. Edge maps look somewhat like x-rays.

When an edge map has been determined, edges can then be identified as groups of adjacent pixels, as described hereinbelow.

In a preferred embodiment of the present invention a 3×3 median filter is applied to the edge map, as a way to remove edges in the pre-scanned image that correspond to scratches on the surface of the scanner bed or scanner cover. A 3×3 median filter operates at each selected pixel location by sorting the 9 edge values situated in a 3×3 pixel neighborhood centered at the selected pixel location, and then replacing the edge value at the selected pixel location with the median of the 9 edge values (i.e. the middle value in the sorted list). For example, if the edge values are $$\begin{bmatrix} 33 & 18 & 7 \\ 17 & 666 & 6 \\ 9 & 14 & 24 \end{bmatrix},$$

then the edge value of 666 in the center pixel location would be replaced by 17, which is the middle value of the ordered list 6-7-9-14-17-18-33-666. Median filters are typically used for removing speckle noise made up of spots of noise in the image. However, since the pre-scanned image is scanned at a very low resolution, scratches occupy very few pixels within the pre-scanned image, and, as such, they are akin to speckle noise.

In an alternate embodiment of the present invention only those pixels having edge values exceeding a prescribed threshold are filtered with a median filter.

The following computer listing of software in the C++ programming language implements the median filter described above in a method named MedianFiltering. The software uses a floating point array, buffer→gradient, to store the values of the edge map, and it uses a Boolean array, buffer→edges, to locate the significant edges. Both arrays are serialized one-dimensional arrays, and have the same number of elements as total pixels in the image. For the element corresponding to the pixel at location (i, j), the value of buffer→gradient gives the edge value at location (i, j), and the Boolean value of the buffer→edges flag indicates whether there is (true) or is not (false) a significant edge at location (i, j). As can be seen in the listing below, Boolean values indicating whether or not an edge value exceeds a threshold, GradientHighThreshold, are stored in buffer→edges.

Observe that the median filter is only applied at locations where the edge value exceeds a threshold, GradientLowThreshold. The method MedianValue stores the edge values for neighboring pixels to pixel (i, j) in an array MedianGrad, taking into account the cases where (i, j) is situated on the border of the edge map. For reference purposes, the QuickSort method that sorts the edge values in MedianGrad is also provided. At the end of the method MedianFiltering, the Boolean values buffer→edges are set to true wherever buffer→gradient exceeds GradientHighThreshold.

```
bool PSmartScanLowRes::MedianFiltering(PProcessBuffers * buffer)
{
register uint32 row = 0;
register uint32 column = 0;
register float* gradient_ptr = 0;
register bool→edges_ptr = 0;
register uint32 rowmax = height;
register uint32 columnmax = width;
float threshold = 0.0;
if (!buffer−>IsGradientMapValid( ) || !buffer−>IsEdgesMapValid( ) )
   return false;
threshold =PThresholdValues::GradientLowThreshold( );
for (gradient_ptr=buffer−>gradient, row=0; row<rowmax; row++)
   for (column=0; column<columnmax; column++, gradient_ptr ++)
   {
      if (*gradient_ptr > threshold)
         *gradient_ptr = MedianValue(row, column, gradient_ptr);
   }
threshold = PThresholdValues::GradientHighThreshold( );
for (gradient_ptr=buffer−>gradient, edges_ptr = buffer−>edges, row=0;
   row<rowmax; row++)
   for (column=0; column<columnmax; column++, gradient_ptr ++,
      edges_ptr++)
   {
      if (*gradient_ptr >threshold)=edges_ptr= true;
   }
return true;
}
inline bool PProcessBuffers::IsEdgesMapValid(void) const
{return (edges !=0);}
float PSmartScanLowRes::MedianValue(uint32 i, uint32 j,
                                    float* gradient_ptr)
{
medianValid = 0;
medianGrad[medianValid++] = *(gradient_ptr);
if (j+1<width)
{
   medianGrad[medianValid++] = *(gradient_ptr+1);
   if (i>0)
      medianGrad[medianValid++] = *(gradient_ptr−width+1);
   if (i+1<Height( ))
      medianGrad[medianValid++] = *(gradiet_ptr+width+1);
}
if (i+1<height)
{
   medianGrad[medianValid++] = *(gradient_ptr+width);
   if (j>0)
      medianGrad[medianValid++] = *(gradiet_ptr+width−1);
}
if (i>0)
{
   medianGrad[medianValid++] = *(gradient_ptr−width);
   if (j>0)
      medianGrad[medianValid++] = *(gradient_ptr_width−1);
}
if (j>0)
   medianGrad[medianValid++] = *(gradient_ptr −1);
QuickSort(0, medianValid−1);
return medianGrad[medianValid/2];
}
void PSmartScanLowRes::QuickSort(sint32 p, sint32 r)
{
sint32 q;
if (p<r)
```

-continued

```
{
   q = Partition(p,r);
   QuickSort(p,q);
   if (q<medianValid) QuickSort(q+1,r);
}
}
sint32 PSmartScanLowRes::Partition(sint32 p, sint32 r)
{
float x = medianGrad[p];
sint32 i = p−1;
sint32 j = r+1;
while (true)
{
   do{j−−;}
   while (medianGrad[i]>x);
   do {i++;}
   while (medianGrad[i]<x);
   if (i<j)
      Exchange(i,j);
   else
      return j;
      }
      }
      inline void PSmartScanLowRes::Exchange(sint32 p, sint32 r)
      {
      float tmp = medianGrad[p];
      medianGrad[p]= medianGrad[r];
      medianGrad[r]= tmp;
      }
```

After the edge map is generated, a preferred embodiment of the present invention identifies those edges that are considered "significant," in order to distinguish between actual edges from the picture and faint edges that might be due to scratches on the glass surface of the scanner bed or patterns on the inside of the scanner cover, or other artifacts that may arise. Based on a method referred to as "hysteresis," scratch removal is preferably accomplished by introducing two prescribed thresholds for edge values—a lower threshold and an upper threshold. Using these thresholds the method of hysteresis identifies "significant edges" as being maximal groups of contiguous pixels, each such group being characterized in that each pixel of the group has an edge value that exceeds the lower threshold, and at least one pixel of the group has an edge value that exceeds the upper threshold. Two pixel locations are considered contiguous if one is a neighbor of the other in any of the eight compass directions, N, NE, E, SE, S, SW, W and NW. Specifically, a pixel at location (i, j) is adjacent to the eight pixel locations (i−1, j−1), (i−1, j), (i−1, j+1), (i, j−1), (i, j+1), (i+1, j−1), (i+1, j) and (i+1, j+1).

On account of the requirement that significant edges contain at least one pixel whose edge value exceeds the upper threshold, scratches are typically not identified as being significant edges.

After the significant edges are detected, scratch and other artifact removal preferably further proceeds by invalidating significant edges with fewer than N contiguous pixels, where N is a parameter referred to herein as a length tolerance. The value of the parameter N can be set by the manufacturer of the kiosk. For scratch and other artifact removal, a value of twenty for the length tolerance is reasonable.

The following computer listing of software in the C++ programming language implements the hysteresis scratch removal described above in a method named HysteresisFiltering. The method that tracks contiguous edge elements is called EdgeHysteresisFollow, and operates recursively, building up a list of contiguous edge elements, named "list." EdgeHysterysisFollow uses an array of pointers to Boolean values, named "known," to keep track of locations that have already been identified. At each level of the recursion EdgeHysteresisFollow invokes a call to itself at a neighboring pixel where the value of buffer→gradient exceeds a threshold, GradientLowThreshold. At each call, the list of contiguous edges is successively built up by invoking list→AddTail.

As seen below, the software introduces a class for an edge element, PEdgeElt, containing a row, a column and a pointer to a next edge element as members. The software introduces a derived class, PChainedEdge, which further includes a Boolean-valued member, *valuePtr. The software also introduces a class, PEdgeIterator, for a list of edge elements. Such a list is built up from successive calls to a method, AddTail, which appends an edge element onto an existing list. The Boolean values, *valuePtr, for each chained edge element in a list of edge elements are set by a method Validate.

When all contiguous edge elements are joined together in a list, control returns to HysteresisFiltering, where the entire list of edge elements is validated as being significant (by setting the Boolean values of its edge elements to true) if its size exceeds LengthThreshold, and invalidated for being insignificant (by setting the Boolean values of its edge elements to false) if its length is less than LengthThreshold. Validation is performed by invocation or the method Validate, which sets the Boolean flags to true for each chained edge element in the list. Specifically, Validate sets the values of *valuePtr to true. This also serves to set the buffer→edges flags to true, since whenever a new edge element is added to a list by AddTail(new PChainedEdge(i, j,edges_ptr), the pointer valuePtr is set to the pointer edges_ptr, which is the same as buffer→edges. Observe also that EdgeHysteresisFollow is only invoked if buffer→edges is true, thus ensuring that any list of contiguous edges that is validated as being significant decidedly contains at least one pixel having an edge value greater than GradientHighThreshold.

```
bool PSmartScanLowRes::HysteresisFiltering(PProcessBuffers* buffer)
{
bool *known = new bool[width*height];
register uint32 i = 0;
register uint32 j = 0;
register bool *known_ptr = known;
register bool *edges_ptr = buffer->edges;
register float lowthreshold = PThresholdValues::GradientLowThreshold( );
register uint32 lengththreshold = PThresholdValues::LengthThreshold( );
if (!buffer->IsEdgesMapValid( )) return false;
for (i=0, known_ptr = known; i<height; i++)
   for (j=0; j<width; j++, known_ptr++)
      *known_ptr = false;
for (i=0; i<height; i++)
{
   for (j=0, known_ptr=known+i*width,edges_ptr=buffer*edges+i*width;
      j<width; j++, known_ptr++, edges_ptr++)
   {
      PEdgeIterator list;
      if ((*edges_ptr) && !(*known_ptr))
      {
         *known_ptr = true;
         EdgeHysteresisFollow(buffer, known, i, j, lowthreshold, &list);
      }
      if (list.Size( ) <lengththreshold) list.Validate(false);
      else
         list.Validate(SideArtifacts(&list));
   }
}
delete known;
return true;
}
void pSmartScanLowRes::EdgeHysteresisFollow(PProcessBuffers* buffer,
bool* map, uint32 i, uint32 j, float lowthreshold, PEdgeIterator* list)
{
uint32 shift = i*width + j;
register bool *known_ptr = map+shift;
```

-continued

```
register bool *edges_ptr = buffer->edges+shift;
register float *gradient_ptr = buffer->gradient+shift;
list ->AddTail(new PChainedEdge(i,j ,edges_ptr));
if (j+1<width)
{
   if (!(*(known__ptr+1)))
   {
      *(known_ptr+1) = true;
      if (*(gradient_ptr+1) > lowthreshold)
         EdgeHysteresisFollow(buffer, map, i, j+1, lowthreshold, list);
   }
   if ((i>0) && !(*(known_ptr−width+1)))
   {
      *(known_ptr−width+1) = true;
      if (*(gradient_ptr−width+1) > lowthreshold)
         EdgeHysteresisFollow(buffer, map, i−1, j+1, lowthreshold, list);
   }
   if ((i+1<height) && !(*(known_ptr+width+1)))
   {
      *(known_ptr+width+1) = true;
      if (*(gradient_ptr+width+1) > lowthreshold)
         EdgeHysteresisFollow(buffer, map, 1+1, j+1, lowthreshold, list);
   }
}
if (i+1 <height)
{
   if (!(*(known_ptr+width)))
   {
      *(known_ptr+width) = true;
      if (*(gradient_ptr+width) > lowthreshold)
         EdgeHysteresisFollow(buffer, map, i+1, j, lowthreshold, list);
   }
   if ((j>0) && !(*(known_ptr+width−1)))
   {
      *(known_ptr+width−1) = true;
      if (*(gradient_ptr+width−1) >lowthreshold)
         EdgeHysteresisFollow(buffer, map, i+1, j−1, lowthreshold, list);
   }
}
if (i>0)
{
   if (!(*(known__ptr−width)))
   {
      *(known_ptr−width) = true;
      if (*(gradient_ptr−width) >lowthreshold)
         EdgeHysteresisFollow(buffer, map, i−1, j, lowthreshold, list);
   }
   if ((j>0) && l(*(known_ptr−width−1)))
   {
      *(known__ptr−width−1) = true;
      if (*(gradient_ptr−width−1) > lowthreshold)
         EdgeHysteresisFollow(buffer, map, i−1, j−1, lowthreshold, list);
   }
}
if ((j>0) && !(*(known_ptr−1)))
{
   *(known_ptr−1) = true;
   if (*(gradient_ptr−1) > lowthreshold)
      EdgeHysteresisFollow(buffer, map, i, j−1, lowthreshold, list);
}
class SMARTSCANDEC PEdgeElt
{
friend PEdgeIterator;
friend PSmartScanLowRes;
friend PSmartScanHighRes;
public:
   uint32            Row(void) const;
   uint32            Column(void) const;
protected:
   PEdgeElt(void);
   PEdgeElt(const PEdgeElt&);
   PEdgeElt(uint32 row, uint32 column, PEdgePtr next = 0);
   PEdgeElt& operator=(const PEdgeElt&);
   virtual           ~PEdgeElt(void);
   PEdgePtr          next;
private:
   uint32            row,
   uint32            column;
};
inline PEdgeElt::PEdgeElt(void)
{ row = column = 0; }
inline PEdgeElt::PEdgeElt(const PEdgeElt& elt)
{ row = elt.row; column=elt.column; next * elt.next; }
inline PEdgeElt::PEdgeElt(uint32 arow, uint32 acolumn, PEdgePtr anext)
{ row = arow; column = acolumn; next = anext; }
inline PEdgeElt::~PEdgeElt(void)
{ }
inline PEdgeElt& PEdgeElt::operator=(const PEdgeElt& elt)
{ row = elt.row; column = elt.column; next = elt.next; return *this; }
inline uint32 PEdgeElt::Row(void) const
{ return row; }
inline uint32 PEdgeElt::Column(void) const
{ return column; }
class SMARTSCANDEC PChainedEdge : public PEdgeElt
{
friend PEdgeIterator;
public:
   PChainedEdge(void);
   PChainedEdge(const PChainedEdge&);
   PChainedEdge(uint32 row, uint32 column, bool* valuePtr,
                                 PEdgePtr next = 0);
   PChainedEdge& operator=(const PChainedEdge&);
   virtual           ~PChainedEdge(void);
   void              SetValue(bool value);
   bool              Value(void) const;
private:
   bool              *valuePtr,
};
inline PChainedEdge::PChainedEdge(void) : PEdgeElt( )
{ valuePtr = 0; }
inline PChainedEdge::PChainedEdge(
                     const PChainedEdge& elt) :
PEdgeElt(elt)
{ valuePtr = elt.valuePtr, }
inline PChainedEdge::PChainedEdge(uint32 arow, uint32 acolumn,
      bool* avaluePtr, PEdgePtr anext) :PEdgeElt(arow, acolumn,
anext)
{ valuePtr = avaluePtr, }
inline PChainedEdge::PChainedEdge(void)
{ }
inline PChainedEdge& PChainedEdge::operator=(const PChainedEdge&
elt)
{ this->PEdgeElt::operator=(elt); valuePtr = elt.valuePtr; return (*this); }
inline void PChainedEdge::SetValue(bool value)
{ *valuePtr = value; }
inline bool PChainedEdge::Value(void) const
{ return *valuePtr, }
typedef PEdgeElt *PEdgePtr,
class SMARTSCANDEC PEdgeIterator
{
public:
                     PEdgeIterator( );
   Virtual           ~PEdgeIterator( );
   void              AddTail(PEdgePtr elt);
   PEdgePtr          First(void) const;
   PEdgePtr          Current(void) const;
   PEdgePtr          Last(void) const;
   PEdgePtr          Next(void);
   void              Reset(void);
   void              Validate(bool val = true);
   uint32            Size(void) const;
   PEdgePtr          first;
private:
   PEdgePtr          current;
   PEdgePtr          last;
   uint32            size;
};
inline PEdgeIterator::PEdgeIterator( )
{ first = current = last = 0; size = 0; }
PFdgeIterator::~PEdgeIterator( )
{
PEdgePtr cur = first, next;
Reset( );
while (cur != last)
{
   next = Next( );
   delete cur;
   cur = next;
}
}
```

-continued

```
inline PEdgePtr PEdgeIterator::First(void) const
{ return first; }
inline PEdgePtr PEdgeIterator::Current(void) const
{ return current; }
inline PEdgePtr PEdgeIterator::Last(void) const
{ return last; }
inline PEdgePtr PEdgeIterator:Next(void)
{ return (current)?(current = current->next):0; }
inline void PEdgeIterator:Reset(void)
{ current = first; }
inline uint32 PEdgeIterator::Size(void) const
{ return size; }
void PEdgeIterator::Addtail(PEdgePtr cur)
{
if(last)
{
   last->next = cur;
   last = cur,
}
else
   first = last = current = cur;
size++;
}
void PEdgeIterator::Validate(bool val)
{
PChainedEdge* cur = (PChainedEdge*)first;
Reset( );
while (cur)
{
   cur->SetValue(val);
   cur = (PChainedEdge*)Next( );
}
}
```

Another type of artifact arises from light leakage at the borders of the scanner cover. Some scanner covers do not seal sufficiently tight to make them light-proof, and as a result shadows appear at the borders of a scanned image. Light leakage artifacts can be removed by eliminating an edge from being considered significant whenever the edge contains a pixel location within a prescribed distance from a border of the scanner bed, and is contained entirely within a strip of a prescribed "thickness" parallel to that border of the scanner bed. The prescribed distance and prescribed thickness are both set to the same prescribed threshold, referred to as a thickness tolerance, although it is to be appreciated that two different thresholds may alternatively be used. For removal of light leakage artifacts, a value of five for the thickness tolerance is reasonable. This serves to eliminate edges that lie entirely within a strip five pixels wide near a border of the scanner bed.

The following computer listing of software in the C++ programming language implements the light leakage artifact removal described above in a method named SideArtifacts. It is called from HysteresisFiltering given above. As can be seen in the listing below, SideArtifacts calculates the minimum and maximum row coordinates and the minimum and maximum column coordinates within a list of contiguous edges. If any of the pixel locations within the list are within a distance ThicknessThreshold from a border of the scanner bed, and if the difference between the maximum and minimum coordinate in the direction transverse to such border is less than ThicknessThreshold, then the list is assumed to be a light leakage artifact, and is invalidated.

```
bool PSmartScanLowRes::SideArtifacts(PEdgeIterator* list)
{
uint32 thick = PThresholdValues::ThicknessThreshold( );
PChainedEdge* cur = (PChainedEdge*)list->First( );
```

-continued

```
uint32 rowmin, rowmax, columnmin, columnmax;
bool h_side_edges = false v_side_edges = false;
rowmin = rowmax = cur->Row( );
columnmin = columnrnax = cur->Column( );
list->Reset( );
while (cur)
{
   if (cur->Row( )<rowmin) rowmin=cur->Row( );
   else if (cur->Row( )>rowmax) rowmax=cur->Row( );
   if (cur->Column( )<columnmin) columnmin=cur->Column( );
   else if (cur->Column( )>columnmax) columnmax=cur->Column( );
   if ((!h_side_edges) && ((cur->Row( ) <thick) ||
      ((Height( )-cur->Row( )) < thick))) h_side_edges = true;
   else if ((!v_side_edges) && ((cur->Column( ) <thick) ||
         ((Width( )-cur->Column( ))<thick))) v_side_edges = true;
   cur = (PChainedEdge*)list->Next( );
}
if (h_side_edges)
{
   if ((sint32(rowmax) - sint32(rowmin))>sint32(thick))
      return true;
   else
      return false;
}
else if (v_side_edges)
}
   if ((sint32(columnmax) - sint32(columnmin))>sint32(thick))
      return true;
   else
      return false;
}
else
   return true;
}
inline uint32 PProcessBuffers::Width(void) const
{ return width; }
inline uint32 PProcessBuffers::Height(void) const
{ return height; }
```

Preferably, after the significant edges have been identified, and scratch and light-leak and other artifacts have been removed, a third step is performed; namely, determining a region of interest. In a preferred embodiment, the present invention determines a desired region of interest by finding a bounding box that has sides parallel to the borders of the scanner bed, and that encloses all pixels belonging to significant edges. This is carried out by identifying the minimum and maximum coordinates of the pixel locations where significant edges are present, in each of the coordinate directions.

In a preferred embodiment of the present invention, the bounding box determined as above is expanded at each side, by extending each side of the bounding box by at least one pixel, to account for imprecision due to the low resolution of the pre-scanned image. This ensures that the bounding box will surround the entire picture when the high-resolution scan is performed.

The following computer listing of software in the C++ programming language implements the determination of the bounding box in a method named BoundingRectangle. The bounding box is specified by Xorigin, Yorigin, Xsize and Ysize. BoundingRectangle finds the top side of the bounding box by searching the edge flags, in order of increasing row, i, and breaking as soon as it encounters an edge flag value of true. Similarly, it finds the left side of the bounding box by searching the edge flags, in order of increasing column, j, and breaking as soon as it encounters an edge flag value of true. It finds the right side of the bounding box by searching the edge flags, in order of decreasing row, i, and breaking as soon as it encounters an edge flag value of true. Finally, it finds the bottom side of the bounding box by searching the edge flags, in order of decreasing column, j, and breaking as soon as it encounters an edge flag value of true. It is noted that at the end of method BoundingRectangle, the bounding box is expanded by extending each side by one pixel.

```
bool PSmartScanLowRes::BoundingRectangle(PProcessBuffers* buffer,
                sint32* Xorigin, sint32* Yorigin, sint32* Xsize, sint32*
Ysize)
{
register sint32 i = 0;
register sint32 j = 0;
register sint32 imax = height;
register sint32 jmax = width;
(*Xorigin) = 0;
(*Yorigin) = 0;
(*Xsize) = width;
(*Ysize) = height;
bool found = false;
for (i=0; (!found) && (i<imax); i++)
{
   for (j=0; j<jmax; j++)
      if (buffer->edges[i*width+j])
      {
         found = true;
         break;
      }
}
(*Yorigin) = i;
if (i>imax) (*Yorigin) =imax−1;
found = false;
for (j=0;(!found) && (j<jmax); j++)
{
   for (i=(*Yorigin); i<max, i++)
      if (buffer->edges[i*width+j])
      {
         found = true;
         break;
      }
}
(*Xorigin) = j;
if (j>=jmax) (*Xorigin) =jmax−1;
found = false;
for (j=jmax−1; (!found) && (j>=0); j−−)
{
   for (i=(*Yorigin); i<imax; i++)
      if (buffer->edges[i*width+j])
      {
         found = true;
         break
      }
}
(*Xsize) = j − (*Xorigin);
if (j<0) (*Xsize) = jmax−1−(*Xorigin);
found = false;
for (i=imax−1; (!found) && (i>=0); i--)
{
   for (j=0; j<jmax; j++)
      if (buffer->edges[i*width+j])
      {
         found = true;
         break;
      }
}
(*Ysize) = i = (*Yorigin);
if (i<0) (*Ysize) = imax−1−(*Yorigin);
if ((*Yorigin) >0) (*Yorigin)--;
if ((*Xorigin) >0) (*Xorigin)--;
(*Ysize) += 2;
if (((*Yorigin) + (*Ysize)) > sint32(height)) (*Ysize) = height = (*Yorigin);
(*Xsize) += 2;
if (((*Xorigin) + (*Xsize)) > sint32(width)) (*Xsize) = height = (*Xorigin);
return true;
}
```

Figure 2:
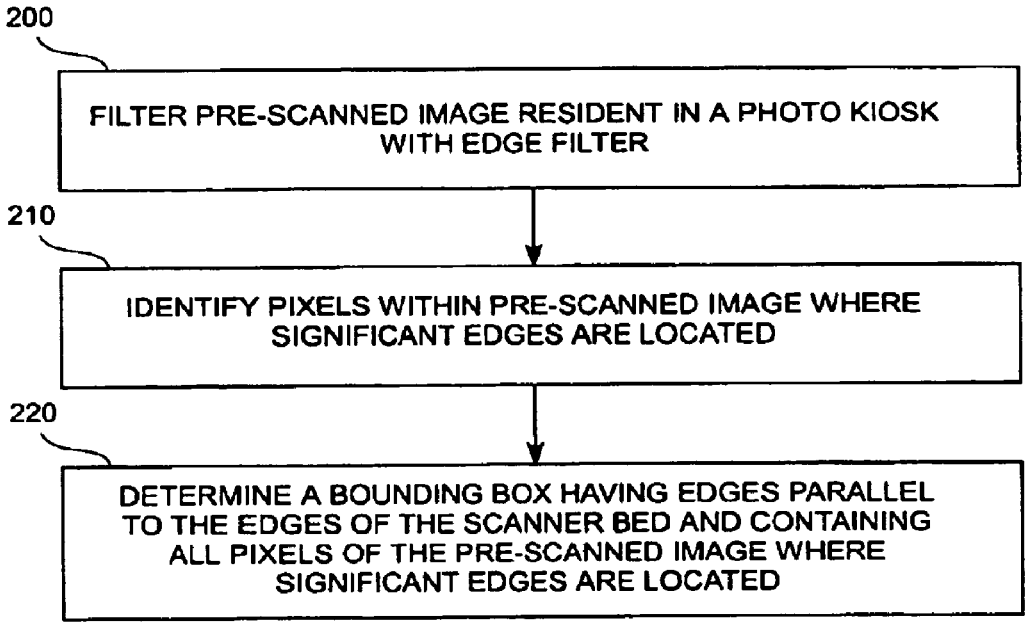
FIG. 2 is a simplified flow chart of a preferred embodiment of the present invention used to determine a region of interest containing a picture, from a low resolution pre-scanned image.

Reference is now made to FIG. 2, which is a simplified flow chart of a preferred embodiment of the present invention used to determine a region of interest containing a picture from a low resolution pre-scanned image. At step 200 the pre-scanned image is filtered with an edge filter to determine an edge map. At step 210 the pixels within the pre-scanned image where significant edges are present, are identified. At step 220 the bounding box with edges parallel to the borders of the scanner bed, and that contains all of the pixels within the pre-scanned image where significant edges are located, is selected. In a preferred embodiment, the smallest such bounding box is selected.

The following computer listing of software in the C++ programming language implements the flowchart of FIG. 2. The AutoCropping method first invokes ComputeLuminance to calculate the luminance values from an input image array, named "image." It then invokes ComputeSobel3×3 to calculate the edge map. It then applies median filtering and hysteresis filtering to remove scratches, light leakage and other artifacts, in order to identify those edges that are significant. Finally, it invokes BoundingRectangle to calculate the region of interest, specified by the parameters column0, row0, columnSize and rowSize.

```
PIntRectangle PSmartScanLowRes::AutoCropping(const
                PixelBufferMgr&
image)
{
sint32 row0 =0, column0 = 0, rowSize = 0, columnSize = 0;
width = image.Width( );
height = image.Height( );
PProcessBuffers* buffer = 0;
if (width && height) buffer = new PProcessBuffers(width, height);
else
   return PIntRectangle( );
bool ok = true;
ok = buffer->AllocateIntensityMap( );
ok = ComputeLuminance(image,buffer);
ok = buffer->AllocateEdgesMap( );
ok = buffer->AllocateGradientMap( );
ok = ComputeSobel3×3(buffer);
buffer->ClearIntensityMap( );
ok = MedianFiltering(buffer);
ok = HysteresisFiltering(buffer);
buffer->ClearGradientMap( );
ok
=BoundingRectangle(buffer,&column0,&row0,&columnSize,&rowSize);
buffer->ClearEdgesMap( );
delete buffer,
return PIntRectangle(column0, row0, column0+columnSize,
row0+rowSize);
}
class SMARTSCANDEC PProcessBuffers
{
friend PSmartScanLowRes;
friend PSmartScanHighRes;
friend PSmartScanDebug;
public:
                PProcessBuffers(uint32 width, uint32 height);
   virtual      ~PProcessBuffers(void);
   bool         AllocateIntensityMap(void);
   bool         AllocateEdgesMap(void);
   bool         AllocateGradientMap(void);
   void         ClearIntensityMap(void);
   void         ClearEdgesMap(void);
   void         ClearGradientMap(void);
   bool         IsIntensityMapValid(void) const;
   bool         IsEdgesMapValid(void) const;
   bool         IsGradientMapValid(void) const;
   uint32       Width(void) const;
   uint32       Height(void) const;
protected:
   float**      intensity;
   float*       gradient;
   bool*        edges;
private:
   uint32       width;
   uint32       height;
};
PProcessBuffers::PProcessBuffers(uint32 aWidth,uint32 aHeight)
```

-continued

```
{
intensity = 0;
gradient = 0;
edges = 0;
width=aWidth;
height=aHeight;
}
PProcessBuffers::~PProcessBuffers(void)
{
ClearIntensityMap( );
ClearEdgesMap( );
ClearGradientMap( );
}
bool PProcessBuffers::AllocateGradientMap(void)
{
uint32 size = 0;
ClearGradientMap( );
gradient = new float[size = width*height];
if (gradient)
   for (uint32 i=0; i<size; i++) gradient[i] = 0.0;
return (gradient != 0);
}
bool PProcessBuffers:AllocateEdgesMap(void)
{
uint32 size = 0;
ClearEdgesMap( );
edges = new bool[size−width*height];
if (edges)
   for (uint32 i=0; i<size; i++) edges[i] = false;
return (edges != 0);
}
bool PProcessBuffers::AllocateIntensityMap(void)
{
ClearIntensityMap( );
bool ok = true;
uint32 j=0;
try
{
   if (height)
   {
      ok = (intensity = (float**)new sint32_ptr[height+2]) !=0;
      for (j=0; ok && (j<height+2); j++)
      {
         ok = (intensity[j]= new float[width+2]) != 0;
         if(ok)
            for (uint32 i=0; i<width+2; i++) intensity[j][i]= 0;
      }
   }
   return ok;
}
catch( . . . )
{
   for (uint32 i=0; i<j; i++) delete intensity[i]
   if (intensity) delete intensity;
   intensity = 0;
   throw;
}
}
void PProcessBuffers::ClearEdgesMap(void)
{
try
{
   if (edges) delete edges;
   edges = 0;
}
catch( . . . )
{
   edges = 0;
   throw;
}
}
void PProcessBuffers::ClearGradientMap(void)
{
try
{
   if (gradient) delete gradient;
   gradient = 0;
}
catch ( . . . )
{
   gradient = 0;
   throw;
}
}
void PProcessBuffers::ClearIntensityMap(void)
{
try
{
   if (intensity)
   {
      if (height)
         for (uint32 i = 0; i < height +2; i++) delete intensity[i];
      if (intensity) delete intensity;
   }
   intensity = 0;
}
catch( . . . )
{
   intensity = 0;
   throw;
}
}
```

After the bounding box is determined as described hereinabove, a high resolution scan of the picture in the scanner bed is then automatically performed within the bounding box. The high resolution scanned image can be used to determine a refined bounding box by the same procedure described hereinabove for determining a bounding box from the low resolution pre-scanned image. Namely, the edges of the image of the picture within the high resolution scanned image are found, and a bounding box that has sides parallel to the borders of the scanner bed and that encloses all pixels belonging to the edges is determined.

The procedure for finding edges of the image of the picture within the high resolution scanned image is preferably different than the procedure for finding edges of the image of the picture within the low resolution pre-scanned image. Within a high resolution scanned image scratches and other artifacts are typically not characterized by speckle noise, and thus a median filter and a 3×3 Sobel filter may not be appropriate for removal of scratches and other artifacts within a high resolution scanned image. Moreover, since the high resolution scanned image typically contains an enormous number of pixels within it, the recursive method of hysteresis described above typically takes a long time to perform.

As described hereinbelow with reference to the fixed box size embodiment, the present invention preferably uses a Laplacian of Gaussian (LoG) method for detecting edges within the high resolution scanned image, based on an analytical formula for the Laplacian of the Gauss kernel given by Equation 3 hereinbelow.

Since there is already a bounding box for the image of the picture within the high resolution scanned image at the outset, it is not necessary to determine all of the edges of the image of the picture in order to derive the contour of the image of the picture within the high resolution scanned image. Rather, it suffices to determine the outermost edges of the image of the picture. Restricting the search for edges to the contour of the image of the picture saves considerable processing time, especially when working with high resolution images, which typically contain enormous numbers of pixels.

As described hereinbelow, to find the contour of the image of the picture it is only necessary to determine edge locations near the sides of the bounding box. Specifically, in a preferred embodiment of the present invention, [starling] *starting* from each pixel location on each side of the bounding box, the edge detection processing moves inwards towards the image of the picture, along lines perpendicular to that side of the bounding box, one pixel at a time, until the first edge location is found. By repeating this for each pixel location on each side of the bounding box, all pixel locations where outermost edges of the picture are situated are determined.

Determining an Angle of Rotation—Variable Box Size Embodiment

In a preferred "variable box size" embodiment of the present invention, determining an angle of rotation involves three or more steps. These steps can be applied either to the low resolution pre-scanned image or to the high resolution scanned image. The first step is to determine the significant edges of the picture within the scanned image. If the low resolution pre-scanned image is used, then this step has already been performed at the stage of determination of a region of interest, as described hereinabove. Otherwise, if the high resolution scanned image is used, then this step must be performed as part of the determination of an angle of rotation. The second step is to generate a plurality of bounding boxes having various angles of rotation relative to the scanner bed, each box surrounding the picture within the scanned image. The third step is to select a bounding box that is most "closely aligned" with the picture, and to use the selected box for determining an angle of rotation. Once an angle of rotation is determined, the kiosk software or hardware can adjust the scanned image so that the picture is aligned with the horizontal and vertical axes of the kiosk display.

As mentioned above, the variable box size embodiment of the present invention can be carried out using the low resolution pre-scanned image or the high resolution scanned image. For the sake of clarity and definiteness, the ensuing description assumes that the low resolution pre-scanned image is used.

In a preferred embodiment such as that shown in FIGS. 1A and 1B, the present invention identifies an angle of rotation by first detecting all of the significant edges of the pre-scanned image, in the manner described hereinabove. Once the significant edges are determined, the second step is performed, and minimal bounding boxes are generated in each of a range of directions relative to the borders of scanner bed 16. Specifically, for a given direction relative to the borders of the scanner bed, determined by an angle, X, a minimal bounding box having two parallel edges oriented in the direction of angle X and two parallel edges oriented in the perpendicular direction, is chosen so as to contain all of the significant edges within it, and to be as small as possible. The minimal bounding box can be determined starting with any initial bounding box having two parallel edges oriented in the direction of angle X and two parallel edges oriented in the perpendicular direction, that contains all of the significant edges within it, by successively contracting the box by moving its edges closer together, keeping them parallel, until each box edge reaches a pixel location where a significant edge of the pre-scanned image is present.

Determination of a minimal bounding box is carried out for a range of angles X. After these minimal bounding boxes have been determined, the third step is performed, and a search is made for the "smallest" of the minimal bounding boxes. The criterion for being smallest can be based on the smallest width, or the smallest height or the smallest area, or another such criterion. The angle X corresponding to the smallest of the minimal bounding boxes is taken to be the sought-after angle of rotation of the picture relative to the borders of the scanner bed. The rationale for this is that the "snuggest" box should be the one most aligned with the picture.

Figure 3:
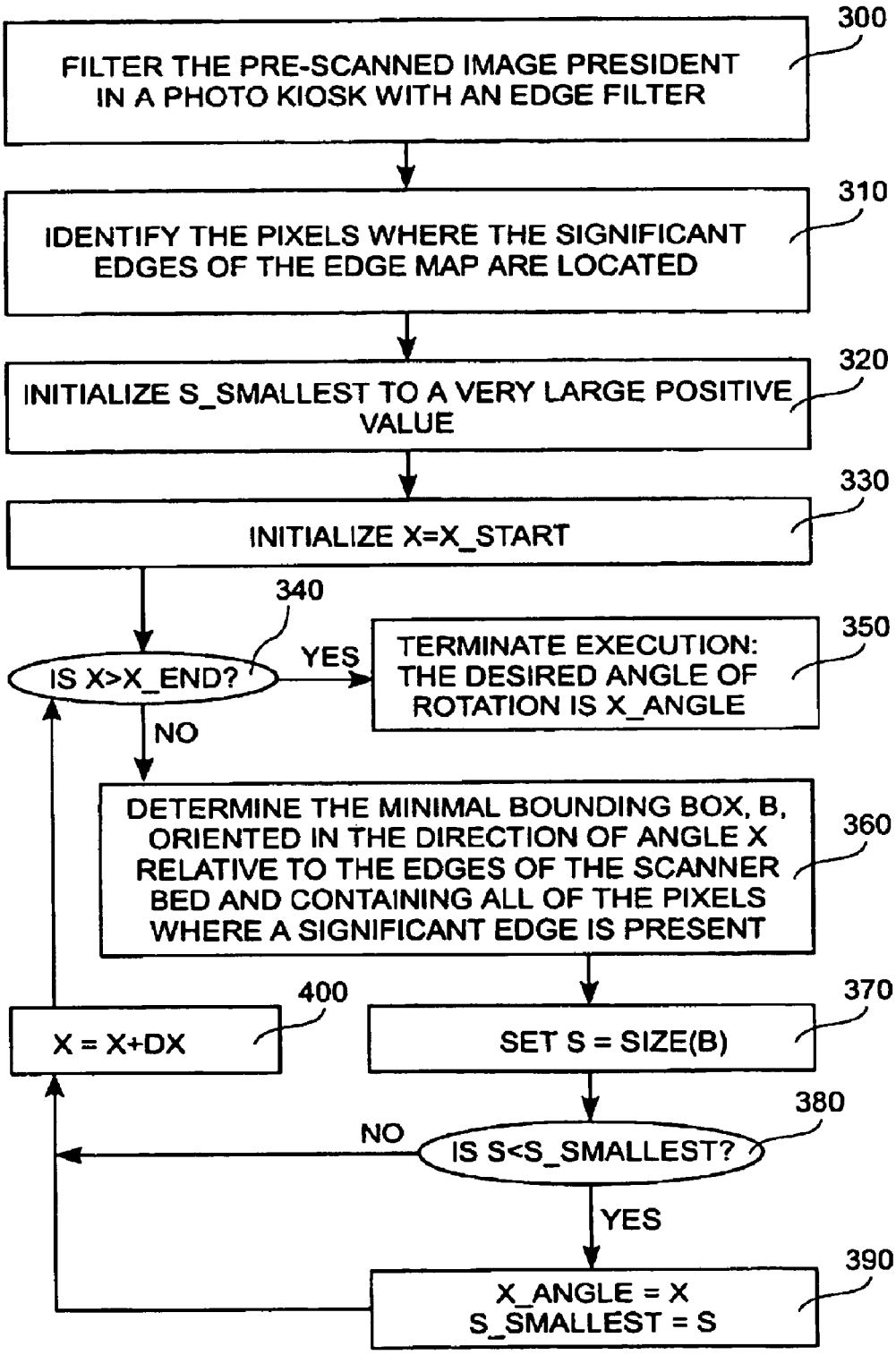
FIG. 3 is a simplified flowchart of a preferred "variable box size" embodiment of the present invention for determining an angle of rotation of a picture relative to the edges of a scanner bed.

Reference is now made to FIG. 3, which is a simplified flowchart of a preferred "variable box size" embodiment of the present invention for determining an angle of rotation of a picture relative to the borders of a scanner bed, from a pre-scanned image. The flowchart describes a search for a bounding box with the smallest size, as the angle of orientation of the bounding box is varied. The delimiters for the angular variation are denoted by X_START and X_END; i.e., the angle X varies between X_START and X_END at increments of DX. The variable that stores the size of the smallest bounding box already found as the search advances over the range of angles, is denoted by S_SMALLEST.

As was done in FIG. 2, at step 300 an edge filter is applied to the pre-scanned image, to produce an edge map. At step 310 the significant edges within the edge map are identified. At step 320 S_SMALLEST is set to a very large positive value. At step 330 an angular direction X is initialized to a starting value X_START. At step 340 a check is made whether X exceeds a final value X_END. If so, then execution terminates at step 350, and the desired angle of rotation is X_ANGLE. If not, then at step 360 a determination is made of the minimal bounding box oriented in the direction of angle X relative to the scanner bed borders and containing all of the pixel locations where a significant edge is present. At step 370 a "size" S of the minimal bounding box is recorded. The size may be the width, or the height or the area, or any other such measure. At step 380 a check is made whether S is less than the minimal size S_SMALLEST. If so, then at step 390 the angle X_ANGLE is set to X, and the size S_SMALLEST is set to S. If not, then at step 400 the angle X is incremented by a small amount DX, and control returns to step 340. It is noted that because S_SMALLEST was set to a very large positive value in step 320 and because X_END is greater than X_START, step 390 will be executed at least once to set X_ANGLE to X.

Figure 4:
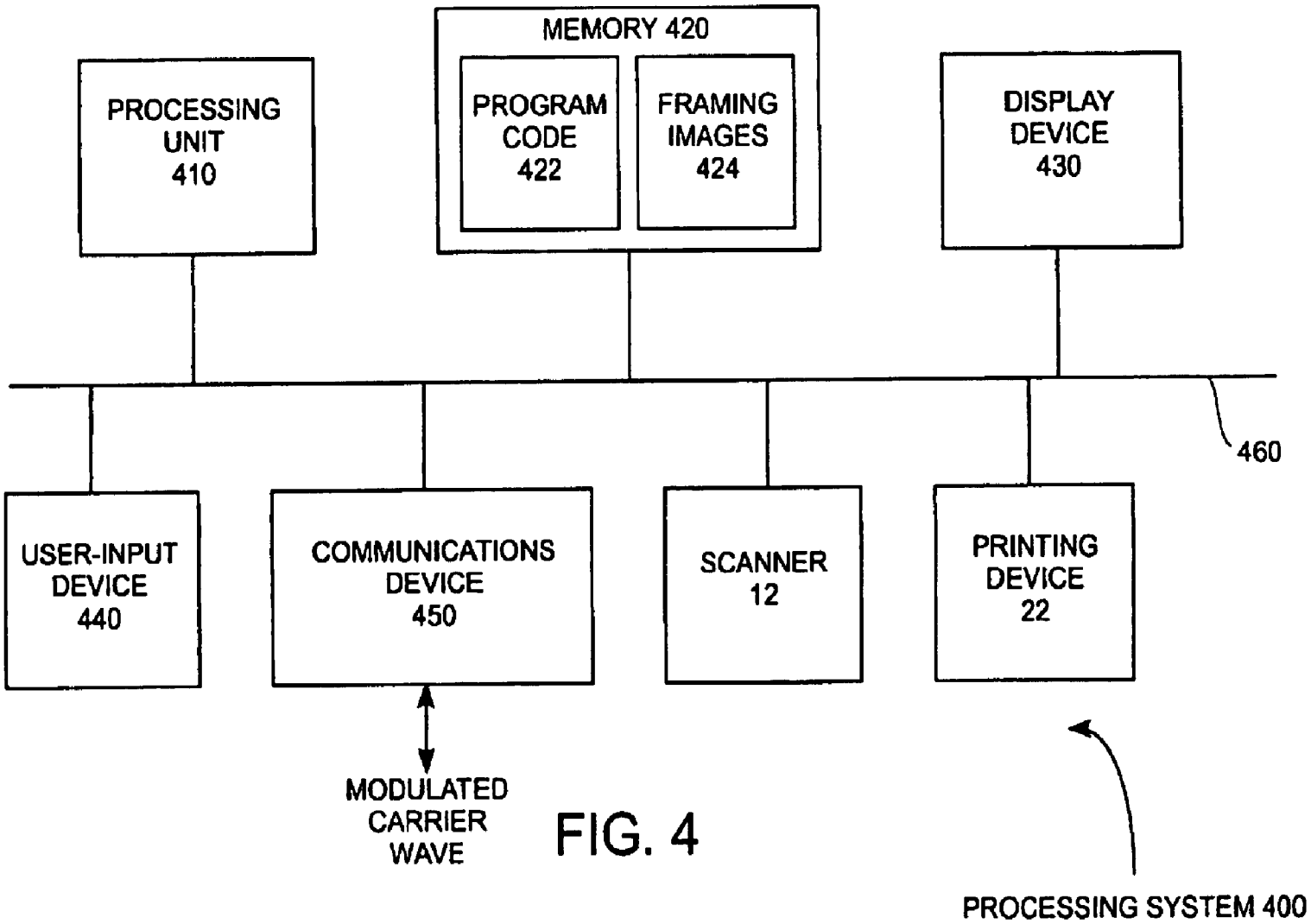
FIG. 4 is a block diagram of a processing system that can be used to perform processing operations in a photo kiosk according to embodiments of the present invention.

FIG. 4 is a block diagram of an embodiment of a processing system 400 that can be used in a photo kiosk to perform the above-described processing operations. The processing system 400 includes a processing unit 410, memory 420, display device 430, user-input device 440, communications device 450, scanner 12 and printing device 22, each coupled to a bus structure 460. In the case of the photo kiosk 10 of FIGS. 1A and 1B, the display device 430 and the user-input device 440 may be implemented by a touch-sensitive screen. In alternate embodiments, other devices may be used to manipulate elements displayed on the display device 430 and to allow a user to input information and selections into the processing system 400.

The processing unit 410 may include one or more general purpose processors, one or more digital signal processors or any other devices capable of executing a sequence of instructions. When programmed with appropriate instructions, the processing unit may be used to implement the kiosk processor 18 shown in FIGS. 1A and 1B, wherein the kiosk processor 18 includes, but is not limited to one or more of an edge processor, edge analyzer, edge finder, pixel processor, and so forth for performing the above described processing operations.

The communications device 450 may be a modem, area network card or any other device for coupling the processing system 400 to a computer network. The communications device 450 may be used to generate or receive a carrier wave modulated with a data signal, for example, for obtaining images or text from a server computer on the World Wide Web or other network, or for receiving updated program code or function-extending program code that can be executed by the processing unit 410 to implement embodiments of the present invention.

The memory 420 may include both system memory and non-volatile storage devices such as magnetic tape, magnetic disk, optical disk, electrically erasable programmable read only memory (EEPROM), or any other computer-readable medium. As shown in FIG. 4, the memory 420 may be used to store program code 422 for performing the above-described processing operations and images 424 that have been scanned using scanner 12. In one embodiment, when power is applied to the processing system 400, operating system program code is loaded from non-volatile storage into system memory by the processing unit 410 or another device, such as a direct memory access controller (not shown). Sequences of instructions comprised by the operating system are then executed by processing unit 410 to load other sequences of instructions, including the above-described processing applications, from non-volatile storage into system memory. Thus, program code for performing or controlling operations in a photo kiosk according to embodiments of the present invention may be obtained from a computer-readable medium, including the above-described carrier wave, and executed in the processing unit 410.

It is noted that the individual processing operations described above may also be performed by specific hardware components that contain hard-wired logic to carry out the recited operations or by any combination of programmed processing components and hard-wired logic. Nothing disclosed herein should be construed as limiting the processing system or other components of a photo kiosk to a single embodiment wherein the recited operations are performed by a specific combination of hardware components.

Determining an Angle of Rotation—Fixed Box Size Embodiment

In a preferred "fixed box size" embodiment of the present invention, determining an angle of rotation involves three or more steps. These steps can be applied either to the low resolution pre-scanned image or to the high resolution scanned image. The first step is to determine the contour of the picture within the scanned image. The second step is to generate a plurality of bounding boxes having various angles of rotation relative to the borders of the scanner bed, each box surrounding the picture within the scanned image. The third step is to select a bounding box that is most "closely aligned" with the picture, and to use the selected box for determining an angle of rotation. Once an angle of rotation is determined, the kiosk software or hardware can adjust the scanned image so that an image of the picture is aligned with the horizontal and vertical axes of the kiosk display.

As mentioned hereinabove, the fixed box size embodiment of the present invention can be carried out using the low resolution pre-scanned image or the high resolution scanned image. For the sake of clarity and definiteness, the ensuing description assumes that the high resolution scanned image is used inter alia to calculate the contour of the picture, as described hereinbelow.

In a preferred embodiment of the present invention edge detection is applied to the high resolution scan to find the outer envelope of the edges; i.e. the contour of the picture. Whereas the edge detection described hereinabove, with respect to the low resolution pre-scanned image, finds all edge locations within the image, for the high resolution scan it suffices to find the outermost edge locations. This simplifies the edge detection process for the high resolution scan, as explained hereinbelow.

For the high resolution scan, the edge detection is preferably performed by applying the Marr-Hildreth Laplacian of Gaussian (LoG) operator. The LoG operator is discussed in Pratt, referenced hereinabove. The LoG operator is a combination of Gaussian smoothing with the Laplacian second derivative operator, and corresponds to convolution with the well-known "Mexican hat" filter given by $$\frac{1}{\pi\sigma^4}\left(1-\frac{r^2}{2\sigma^2}\right)\exp\left(-\frac{r^2}{2\sigma^2}\right), \tag{3}$$

where r is the radial coordinate $r=x^2+y^2$. The parameter $\sigma$ corresponds to the standard deviation of the Gaussian function, and is a spread parameter. Based on the technical information from the Internet web site:

http://www.cs.ucl.ac.uk/research/mip/mipus/IUE/v1.3.1/tasklibs/iue/edge-detection the value of $\sigma$ for human visual perception is taken to be a value between 1.2 and 1.4, and the window for the convolution with the above filter is taken to be a square of size Round($6\sigma+3.5$).

When using the Marr-Hildreth LoG operator, edge locations are identified as the zero-crossings of the result when the scanned image is convoluted with the above filter. Since zero crossings do not always lie at pixel locations, several methods are used to identify edge locations. These methods appear in Pratt, and are known to those skilled in the art of edge detection. For example, in one method edge locations are marked at each pixel with a positive response that has a neighbor with a negative response. In another method, the maximum of all positive responses and the minimum of all negative responses are formed in a 3×3 window around a selected pixel location. If the magnitude of the difference between the maximum and the minimum exceeds a threshold, an edge is judged to be present at the selected pixel location.

In a preferred embodiment of the present invention, since it is the contour of the picture within the scanned image that is being sought, edge locations are only computed near the sides of the bounding box. Starting from each pixel location on each side of the bounding box, the edge detection processing moves inwards towards the picture, along lines perpendicular to that side of the bounding box, one pixel at a time, until the first edge location is found. By repeating this for each pixel location on each side of the bounding box, all pixel locations where outermost edges of the picture are situated are determined.

The following computer listing of software in the C++ programming language implements Marr-Hildreth Laplacian of Gaussian edge detection as used in a preferred embodiment of the present invention. The constructor marrHildrethFilter calculates the values of the Mexican hat filter from Equation 3 and sets the elements of the array logaussian accordingly. The window size, fwidth, is set equal to the value sint32(float (6.0)*sigma+float(3.5)), as described hereinabove. The method MarrHildrethSmoothing carries out the convolution for performing the LoG filter on the luminance values of an input array, named "image."

The method MarrHildrethEdgesDetection computes the zero crossings of the LoG for the luminance values. The long string of logical tests within the if-statements do the actual check for a zero crossing. The first if-statement examines the values of the LoG at the four neighboring pixel locations (r, c), (r+1, c), (r, c+1) and (r+1, c+1), and the second if-statement examines the values of LoG at the four neighboring pixel locations (r, c), (r+1, c), (r, c−1) and (r+1, c−1). If the LoG value at (r, c) has a different sign than one of its values at the three other pixel locations, then (r, c) is marked as an edge location and added to the list of outermost edges. Whenever an edge is detected, the bounding rectangle NewCrop is adjusted as necessary so as to include the detected edge location within it.

For each row value, r, the edge detection proceeds in two directions; namely, in the direction of increasing column value, c, and in the direction of decreasing column value, c. The edge detection breaks out of the loop on column value, c, as soon as the first edge location is detected, which suffices to detect the outermost edges.

```
class marrHildrethFilter
{
public:
                marrHildrethFilter(float sigma, uint32 windowsize = 0);
   virtual      ~marrHildrethFilter(void);
   void         SetElement(sint32 i, sint32 j, float x);
   float        LoG(sint32 i, sint32 j) const;
   sint32       Size(void) const;
private:
   float**      logaussian;
   sint32       halfsize;
};
inline void marrHildrethFilter::SetElement(sint32 i, sint32 j, float x)
{
logaussian[i+halfsize][j+halfsize]= x;
}
inline float marrHildrethFilter::LoG(sint32 i, sint32 j) const
{
return logaussian[i+halfsize][j+halfsize];
}
inline sint32 marrHildrethFilter::Size(void) const
{
return halfsize;
}
inline marrHildrethFilter::~marrHildrethFilter(void)
{
if (logaussian)
{
   for (sint32 i=−halfsize; i<=halfsize; i++)
      delete logaussian[i+halfsize];
   delete logaussian;
}
}
typedef float *floatPtr;
marrHildrethFilter::marrHildrethFilter(float sigma, uint32 windowsize)
{
if (windowsize) halfsize = (windowsize − 1)/2;
else
{
   sint32 fwidth = sint32(float(6.0)*sigma+float(3.5));
   halfsize = (fwidth − 1)/2;
}
sint32 size = halfsize*2+1;
logaussian = new floatPtr[size];
sint32 x,y;
for (x = 0; x<size; x++)
   logaussian[x]= new float[size];
float sigma2 = sigma * sigma;
float dc = float(1.0/(2.0*PI*sigma2*sigma2));
dc *= float(0.5 * sigma2);
float sigNorm = float(−1.0/(2.0*sigma2));
float norm,coef = float(1.0/sigma2);
for (y=−halfsize; y<=halfsize; y++)
   for (x=−halfsize; x<=halfsize; x++)
   {
      norm = float(x*x + y*y);
      SetElement(x,y,float(dc*(2.0-norm*coef)*exp(norm*sigNorm)));
   }
}
float PSmartScanHighRes::MarrHildrethSmoothing(
  const NPixelBufferMgr& image, PProcessBuffers* buffer, sint32 i,
sint32 j,
  marrHildrethFilter* mh)
{
static const float EPS = PThresholdValues::ZeroCrossingPrecision( );
register float* ptr = &(buffer->gradient[i*width+j]);
if (*ptr != NOT_COMPUTED) return (*ptr);
(*ptr) = 0.0;
register sint32 size = mh->Size( );
sint32 x,y;
for (y=−size; y<=size; y++)
   for (x=−size; x<=size; x++)
      *ptr += mh->LoG(y,x)*ComputeLuminance(image,buffer,i+x,j+y);
if (ABS(*ptr)<EPS)
   (*ptr) = 0.0;
return (*ptr);
}
bool PSmartScanHighRes::MarrHildrethEdgesDetection(
                    const NPixelBufferMgr& image, PProcessBuffers*
buffer,
```

-continued

```
                    PIntRectangle* newCrop, PEdgeIterator* list)
{
register sint32 r;
register sint32 c,c0;
register sint32 rmax = sint32(height);
register sint32 cmax = sint32(width);
marrHildrethFilter mh(PThresholdValues::LogSigma( ));
if (!buffer->IsIntensityMapValid( ) || !buffer->IsGradientMapValid( ))
   return false;
*newCrop = PIntRectangle( );
bool is1stCall = true;
for (r=0; r<rmax; r++)
{
   for (c=0; c<cmax; c++)
   {
      if ((MarrHildrethSmoothing(image,buffer,r,c,&mh) != float(0.0)) &&
         ((MarrHildrethSmoothing(image,buffer,r,c,&mh) >0) &&
         ( ((r+1<rmax) &&
         (MarrHildrethSmoothing(image,buffer,r+1,c,&mh)<0)) ||
         ((c+1<cmax) &&
         (MarrHildrethSmoothing(image,buffer,r,c+1,&mh)<0)) ||
         ((r+1<rmax) && (c+1<cmax) &&
         (MarrHildrethSmoothing(image,buffer,r+1,c+1,&mh)<0)))) ||
         ((MarrHildrethSmoothing (image,buffer,r,c,&mh) <0) &&
         (((r+1<rmax) &&
         (MarrHildrethSmoothing(image,buffer,r+1,c,&mh)>0)) ||
         ((c+1<cmax) &&
         (MarrHildrethSmoothing(image,buffer,r,c+1,&mh)>0)) ||
         ((r+1<rmax) && (c+1<cmax) &&
         (MarrHildrethSmoothing(image,buffer,r+1,c+1,&mh)>0)))))
      {
         list->AddTail(new PChainedEdge(r,c,0));
         if (is1stCall)
         {
            *newCrop = PIntRectangle(c,r,c+1 ,r+1);
            is1stCall = false;
         }
         else
         {
            if (sint32(r)<newCrop->Top( )) newCrop->SetTop(r);
            else if (sint32(r+1)>newCrop->Bottom( ))
               newCrop->SetBottom(r+1);
            if (sint32(c)<newCrop->Left( )) newCrop->SetLeft(c);
         }
         break;
      }
}
if(c != cmax)
{
      c0 = c;
for (c=cmax−1; c>c0; c−−)
         {
         if ((MarrHildrethSmoothing(image,buffer,r,c,&rnh) != float(0.0))
         &&
            ((MarrHildrethSmoothing(image,buffer,r,c,&mh) >0) &&
            ( ((r+1<rmax) &&
            (MarrHildrethSmoothing(image,buffer,r+1,c,&mh)<0)) ||
            ((c>0) &&
            (MarrHildrethSmoothing(image,buffer,r,c−1,&mh)<0)) ||
            ((r+1<rmax) && (e>0) &&
            (MarrHildrethSmoothing(image,buffer,r+1,c-1,&mh)<0)))) ||
            ((MarrHildrethSmoothing(image,buffer,r,c,&mh) <0) &&
            ( ((r+1<rmax) &&
            (MarrHildrethSmoothing(image,buffer,r+1,c,&mh)>0)) ||
            ((c>0) &&
            (MarrHildrethSmoothing(image,buffer,r,c−1,&mh)>0)) ||
            ( (r+1<rmax) && (c>0) &&
            (MarrHildrethSmoothing(image,buffer,r+1,c−1,&mh)>0)))))
         {
            list*AddTail(new PChainedEdge(r,c,0));
            if (sint32(c+1 )>newCrop->Right( )) newCrop->SetRight(c+1);
            break;
         }
      }
   }
}
return true;
}
```

As in the variable box size embodiment described hereinabove, the second step in the fixed box size embodiment generates boxes having various angles of rotation X relative to the borders of the scanner bed, and the third step analyzes the boxes to determine the box that is most aligned with the picture. However, in the fixed box size embodiment it is not necessary that each of the boxes generated is itself "smallest," as was the case in the variable boxes size embodiment. Instead, in the fixed box size embodiment, the various boxes are generated by rotating a reference box about its center. The reference box is chosen large enough so that irrespective of how it is rotated about its center, it encloses the entire contour of the picture within the high resolution scanned image.

In a preferred embodiment of the present invention, the center of the reference box is chosen to be the centroid of the shape enclosed by the contour of the picture; i.e., the centroid of the shape of the picture. The centroid of a shape is the average of all pixel locations within the shape, and corresponds to the center of gravity of a uniform plate having such a shape. Moreover, as described hereinbelow with reference to FIG. 5, by choosing the reference box to be large enough so that it contains a circle that surrounds the previously determined bounding box, it is ensured that the reference box will enclose the entire contour of the picture, irrespective of the angle through which it is rotated about its center.

Figure 5:
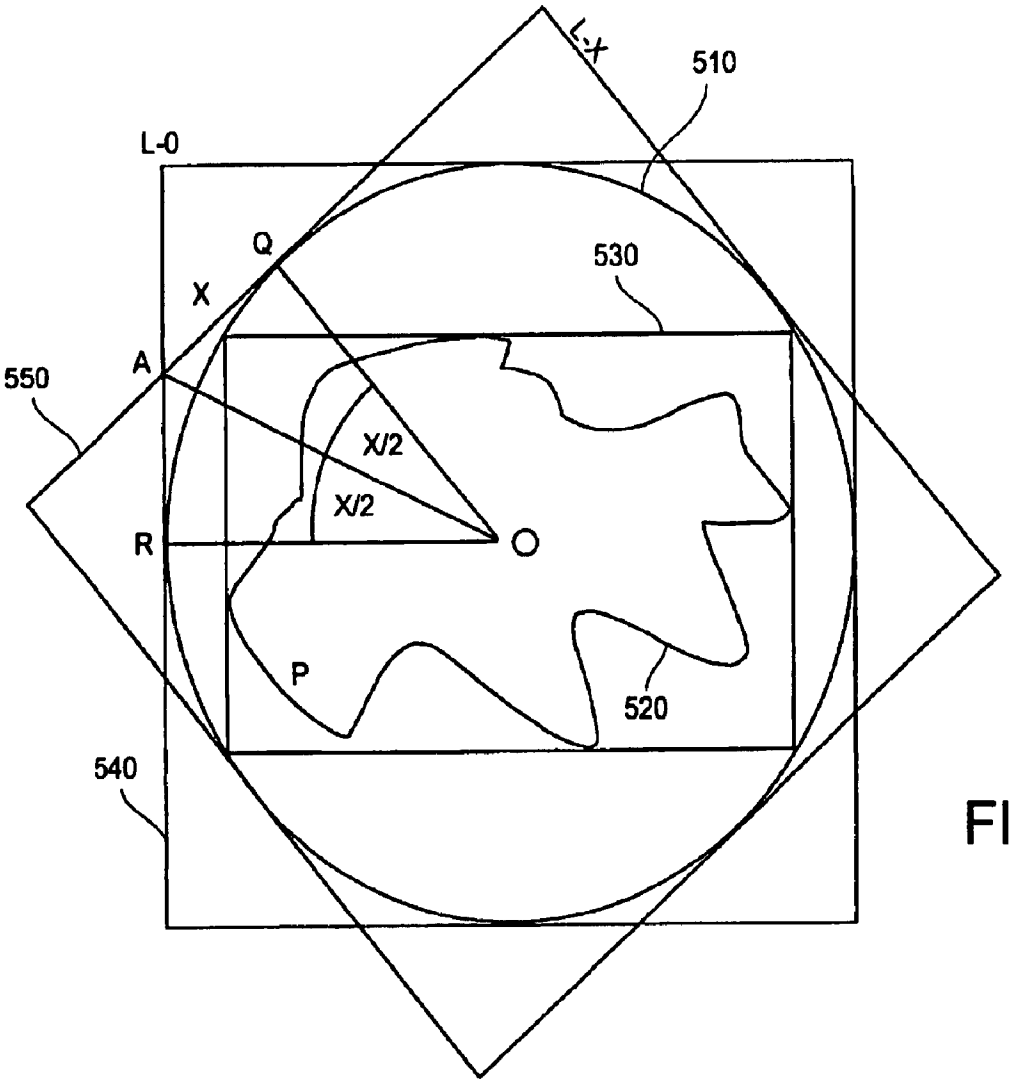
FIG. 5 is an illustration of the determination of concentric boxes used to calculate an angle of rotation of a picture, in accordance with a preferred "fixed box size" embodiment of the present invention.

Reference is now made to FIG. 5, which illustrates the determination of boxes used to calculate an angle of rotation of a picture, in accordance with a preferred "fixed box size" embodiment of the present invention. A circle 510 is generated in such a way that it completely surrounds contour 520 of a picture. Such a circle can be constructed by circumscribing a previously determined bounding box 530 of the picture. The center O of circle 510 is chosen to be the centroid of the shape enclosed by contour 520; i.e., the shape of the picture itself.

A reference box 540 is then chosen to have the same center point, O, and to enclose circle 510. This ensures that when reference box 540 is rotated about its center O by any angle of rotation, the rotated box 550 will still enclose the entire picture within it. It is not essential in this fixed box size embodiment of the present invention that boxes 540 or 550 be constructed to be as small as possible.

The following computer listing of software in the C++ programming language calculates the reference box 540 according to a preferred embodiment of the present invention. The variables i0 and j0 are used to accumulate sums of the row and column coordinates, respectively, of all pixels on the outermost edges of the picture. The sums are averaged by dividing by the number of such pixels, and the average values are stored in rowCenter and columnCenter. These average values determine the center of the desired reference box 540. The half-width/half-length of the reference box is set to half of the length of the diagonal of a given bounding box cropArea, plus an additional pixel.

```
PFloatRectangle PSmartScanHighRes::BarycentricBoundingBox(
                const PIntRectangle& cropArea, PEdgeIterator*
edges,
                float* rowCenter, float* columnCenter)
{
sint32 i0=0, j0=0, nb = 0;
PEdgePtr cur = edges->First( );
edges->Reset( );
while (cur = edges->Current( ))
{
    i0 += cur->Row( );
    j0 += cur->Column( );
```

-continued

```
    edges->Next( );
    nb++;
}
*rowCenter = float(i0)/float(nb);
*columnCenter = float(j0)/float(nb);
sint32 size = sint32(sort(cropArea.Width( )*cropArea.Width( ) +
            cropArea.Height( )*cropArea.Height( ))/2.0 + 1.0);
return PFloatRectangle(*columnCenter-size,
            *rowCenter-
size, *columnCenter+size, * rowCenter+size);
}
```

In a preferred fixed box size embodiment, the present invention calculates, for each orientation angle X, a sum D(X) that gives a measure of the average distance between the box oriented at angle X and the picture. Specifically, D(X) is given by the expression $$D(X) = \sum_{\substack{\text{all outermost edge} \\ \text{pixel locations } p}} \partial(p, B(X)) \tag{1}$$

where p denotes a pixel location in the edge envelope of the picture, and B(X) denotes the box that is oriented at angle X. Thus D(X) equals the sum of the distances, ∂(p, B(X)), from each pixel location p in the edge envelope of the picture to the box B(X). The distance from a pixel location p to a box B(X) is defined to be the minimal distance from p to any of the four sides of B(X). Specifically, the four distances from pixel location p to each side of box B(X) are considered, and the value of ∂(p, B(X)) is set to the smallest of these four distances. The distance from a pixel location p to a side of a box is measured along the line perpendicular to the side.

Were D(X) to be normalized by dividing by the number of pixel locations in the outermost edges, it would represent an average distance between the outermost edges of the picture and box B(X). As such, D(X) serves as a metric for how well box B(X) is aligned with the picture. The angle of rotation X for which D(X) is smallest is the angle that brings the reference box closest to the pixels of the outermost edges of the picture. In other words, the box B(X) that is "most aligned" with the picture is the one for which D(X) is smallest, among all values of X.

For the special case of the reference box 540 in FIG. 5, whose sides are aligned with the scanner bed and whose angle of rotation is X=0, the distance from any pixel location p to a side of the box corresponds to a difference in row index between p and the side (for the vertical sides of the reference box) or a difference in column index between p and the side (for the horizontal sides of the box).

Figure 6:
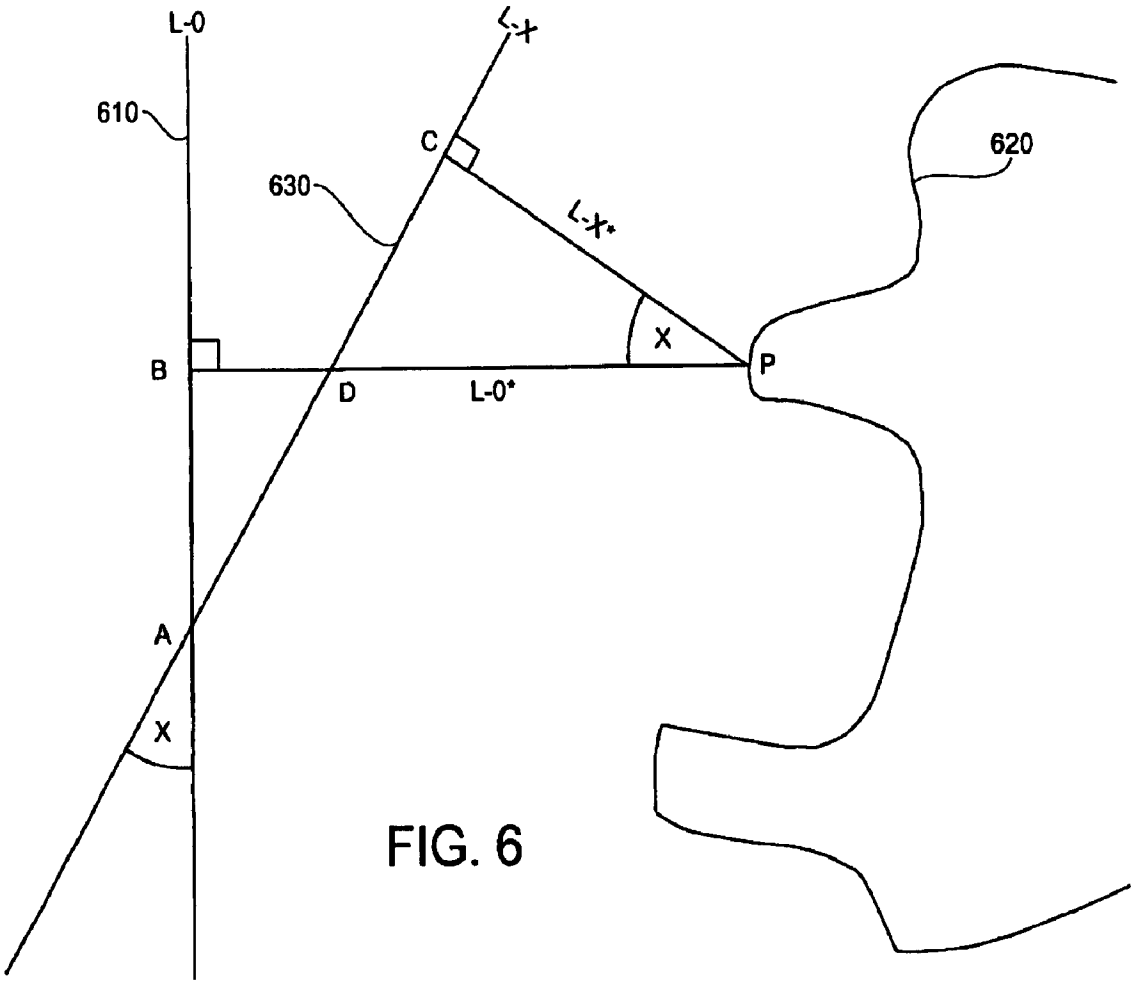
FIG. 6 is an illustration of the computation of the distance from a pixel location to a side of a box that is not a reference box (i.e. having non-zero angle of rotation relative to the scanner bed), based on the distance from the same pixel location to a side of a reference box, in accordance with a preferred "fixed box size" embodiment of the present invention.

Reference is now made to FIG. 6 which illustrates the computation of distance, in a preferred embodiment of the present invention, from a pixel location to a side of a box that is not a reference box (i.e. a box having non-zero angle of rotation relative to the scanner bed), based on the distance from the same pixel location to a side of a reference box, in accordance with a preferred "fixed box size" embodiment of the present invention. In FIG. 6, a line L-0 denotes the side 610 of reference box (such as box 540 from FIG. 5) that is aligned with a scanner bed, and a point P denotes a selected pixel location situated on a contour 620 of the picture. The line L-X denotes the corresponding side 630 of a box B(X) that is rotated by an angle X (such as box 550 from FIG. 5), and thus oriented by angle X relative to the scanner bed.

A point A denotes the point of intersection of the lines L-0 and L-X. The location of point A can be readily determined from the distance OR and the angle X. Indeed, referring back to FIG. 5 where the corresponding sides L-0 and L-X are indicated, and their point of intersection is denoted by A, it can be seen that radius OR is perpendicular to L-0, and radius OQ is perpendicular to L-X. As can be seen further in FIG. 5, the angle QOR is equal to X, and the angle AOR is equal to X/2. It thus follows from a consideration of triangle AOR that AR=OR* tan(X/2), and this determines the position of point A along line L-0.

Referring again to FIG. 6, the line L-0* is taken from point P perpendicular to line L-0, and it intersects line L-0 at a point B. The length PB represents the distance between pixel location P and side L-0, and can be readily determined from the pixel coordinates of P and of line L-0. Indeed, since L-0 is aligned with the scanner bed, the length PB is determined as the difference in row index (if L-0 is a aligned to vertically with the scanner bed) or column index (if L-0 is aligned horizontally with the scanner bed) between the location of P and the location of L-0. Similarly the location of point B can also be readily determined from the pixel coordinates of P and of line L-0.

The distance AB can also be readily determined since the locations of point A and point B are both known.

The line L-X* is taken from point P perpendicular to line L-X, and it intersects line L-X at a point C. The length PC represents the desired distance between pixel location P and side L-X. A point D in FIG. 6 denotes the point of intersection of line L-0* and L-X*. By considering the triangles ABD and PCD one can verify that the distance PC is given by the expression:

$$PC=PB*\cos(X)-AB*\sin(X). \quad (2)$$

For each pixel location P on an outermost edge of the picture, the calculation of PC is performed for each of the four sides of box B(X), and the smallest of these four values is used for the term ∂(p,B(X)) in Equation 1 above. These terms are cumulatively summed over all such pixel locations to calculate the value of D(X) in Equation 1 above. The desired angle of rotation of the picture is that angle X for which D(X) is minimized.

The following computer listing of software in the C++ programming language implements the calculation of D(X) as used in a preferred embodiment of the present invention. The method InitializeDistanceEdges calculates the sum D(0) of all the distances from each pixel location in an outermost edge of the picture to the reference box, named "box," for which X=0. It uses a class PDistanceEdge inherited from PedgeElt that includes four members leftDist, topDist, rightDist and bottomDist, representing the distances from the edge location to the four sides of a box. The method Distance computes the sum D(X) of the distances from each pixel location in an outermost edge of the picture to the box obtained by rotating the reference box by an angle alpha (i.e. X) about its center, using Equation 2 above.

```
float PSmartScanHighRes::InitializeDistanceEdges(PEdgeIterator* edges,
                PEdgeIterator* new_edges, const PFloatRectangle&
box)
{
float distance = 0.0;
PEdgePtr chained_edge = edges->First( ), next = 0;
edges->Reset( );
PEdgePtr dist_edge;
while (chained_edge)
```

-continued

```
{
  next = chained_edge->next;
  dist_edge = new PDistanceEdge(chained edge->Row( ),
            chained_edge->Column( ),
            flat(box.Left( )-chained_edge-
>Column( )),
            float(box.Top( )-chained_edge->Row( )),
            float(box .Right( )-chained_edge-
>Column( )),
            float(box.Bottom( )-chained_edge-
>Row( )));
  new_edges->AddTail(dist_edge);
  distance += DistanceMinimal(((PDistanceEdge*) dist_edge)->Left( ),
            ((PDistanceEdge*)dist_edge)->Top( ),
            ((PDistanceEdge*)dist_edge)->Right( ),
            ((PDistanceEdge*)dist_edge)-
>Bottom( ));
  chained_edge = next;
}
return distance;
}
float PSmartScanHighRes::Distance(PEdgeIterator* edges, const
PFloatRectangle& boundingBox, float Xc, float Yc, float angle)
{
float distance = 0.0, cosinus = float(cos(angle)), sinus = float(sin(angle));
float left, top, right, bottom;
float Xm = float(boundingBox.Left( ));
float Ym = Yc;
float XXm = Xm*cosinus − Ym*sinus;
float YYm = Xm*sinus + Ym*cosinus;
float left_Xr = Xm;
float left_Yr = (−(Xc−XXm)*Xm+(Xc−XXm)*XXm+
            (Yc−YYm)*YYm)/(Yc−YYm);
Xm = float(boundingBox.Right( ));
Ym = Yc;
XXm = Xm*cosinus − Ym*sinus;
YYm = Xm*sinus +Ym*cosinus;
float right_Xr = Xm;
float right_Yr = (−(Xc−XXm)*Xm+(Xc−XXm)*XXm+
            (Yc−YYm)*YYm)/(Yc−YYm);
Xm = Xc;
Ym = float(boundingBox.Top( ));
XXm = Xm*cosinus − Ym*sinus;
YYm = Xm*sinus +Ym*cosinus;
float top_Yr = Ym;
float top_Xr = (−(Yc−YYm)*Ym+(Xc−XXm)*XXm+
            (Yc−YYm)*YYm)/(Xc−XXm);
Xm = Xc;
Ym = float(boundingBox.Bottom( ));
XXm = Xm*cosinus = Ym*sinus;
YYm = Xm*sinus +Ym*cosinus;
float bottom_Yr = Ym;
float bottom_Xr = (−(Yc−YYm)*Ym+(Xc−XXm)*XXm+
            (Yc−YYm)*YYm)/(Xc−XXm);
PDistanceEdge* cur = (PDistanceEdge*)edges->First( );
edges->Reset( );
while (cur)
{
  left = cur->Left( )*cosinus − (cur->Row( ) = left_Yr)*sinus;
  right = cur->Right( )*cosinus − (cur->Row( ) = right_Yr)*sinus;
  top = cur->Top( )*cosinus − (cur->Column( ) = top_Yr)*sinus;
  bottom=cur->Bottom( )*cosinus − (cur->Column( ) = bottom_Yr)*sinus;
  distance += DistanceMinimal(left, top, right, bottom);
  cur = (PDistanceEdge*) (edges->Next( ));
}
return distance;
}
float PSmartScanHighRes::DistanceMinimal(float aa, float ab, float ac,
                float ad)
{
float a = ABS(aa);
float b = ABS(ab);
float c = ABS(ac);
float d = ABS(ad);
if (a<b)
{
  if (a<c)
    return (a<d)?a:d;
  else
    return (c<d)?c:d;
```

-continued

```
}
else
{
   if (b<c)
      return (b<d)?b:d;
   else
      return (c<d)?c:d;
}
}
class SMARTSCANDEC PDistanceEdge:public PEdgeElt
{
friend PEdgeIterator;
public:
            pDistanceEdge(void);
            PDistanceEdge(const PDistanceEdge&);
            PDistanceEdge(uint32 arow, uint32 acolumn, float leftDist,
               float topDist, float rightDist,
               float bottomDist, PEdgePtr next = 0);
            PDistanceEdge& operator=(const PDistanceEdge&);
   virtual     ~PDistanceEdge(void);
   float       Left(void) const;
   float       Top(void) const;
   float       Right(void) const;
   float       Bottom(void) const;
   void        SetLeft(float);
   void        SetTop(float);
   void        SetRight(float);
   void        SetBottom(float);
private:
   float       leftDist, topDist, rightDist, bottomDist;
};
inline PDistanceEdge::pDistanceEdge(void):PEdgeElt( )
{ leftDist = topDist = rightDist = bottomDist = 0.0; }
inline PDistanceEdge::PDistanceEdge(
                  const PDistanceEdge& elt):
PEdgeElt(elt)
{ leftDist = elt.leftDist; topDist = elt.topDist; rightDist = elt.rightDist;
bottomDist = elt.bottomDist; }
inline PDistanceEdge::PDistanceEdge(uint32 arow, uint32 acolumn,
               float aleftDist, float atopDist,
               float arightDist, float abottomDist,
               PEdgePtr anext):PEdgeElt(arow, acolumn,
anext)
{ leftDist = aleftDist; topDist = atopDist; rightDist = arightDist;
bottomDist = abottomDist; }
inline PDistanceEdge& PDistanceEdge::operator=(
               const PDistanceEdge&
elt)
{ this->pEdgeElt::operator=(elt):leftDist = elt.leftDist; topDist = elt.topDist;
rightDist = elt.rightDist; bottomDist = elt.bottomDist; return (*this); }
inline PDistanceEdge::~PDistanceEdge(void)
{ }
inline float PDistanceEdge::Left(void) const
{ return leftDist; }
inline float PDistanceEdge::Top(void) const
{ return topDist; }
inline float PDistanceEdge::Right(void) const
{ return rightDist; }
inline float PDistanceEdge::Bottom(void) const
{ return bottomDist; }
inline void PDistanceEdge::SetLeft(float val)
{ leftDist = vat; }
inline void PDistanceEdge::SetTop(float val)
{ topDist = val; }
inline void PDistanceEdge::SetRight(float val)
{ rightDist = val; }
inline void PDistanceEdge::SetBottom(float val)
{ bottomDist = val; }
```

Figure 7:
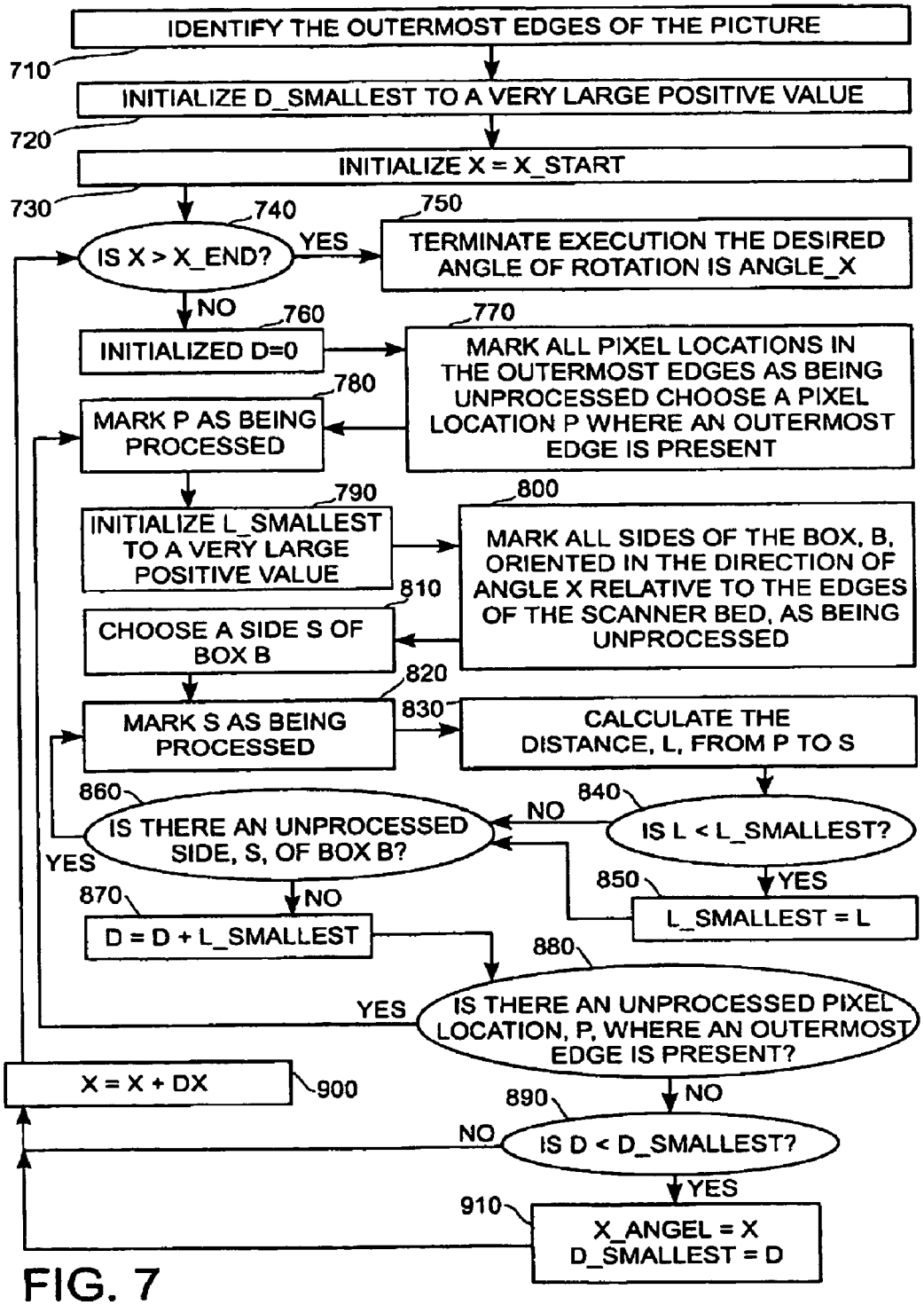
FIG. 7 is a simplified flowchart of a preferred "fixed box size" embodiment of the present invention for determining an angle of rotation of a picture relative to a scanner bed, based on a contour of the picture.

Reference is now made to FIG. 7, which is a simplified flowchart of a preferred "fixed box size" embodiment of the present invention for determining an angle of rotation of a picture relative to the b borders of a scanner bed, based on a contour of the picture. At step 710 the outermost edges of the picture are determined within a scanned image. The determination of outermost edges based on knowledge of a bounding box that surrounds the picture is described hereinabove. At step 720 the variable D_SMALLEST is initialized to a very large positive value. This ensures that the first value of the variable D calculated below is less than D_SMALLEST, and thus accepted.

The angle of orientation, X, is varied within a range from X_START to X_END with a step size of DX, in order to search for the desired angle of rotation of the picture. It is assumed that X_START is less than X_END. At step 730, X is initialized to the value X_START. At step 740 a test is made whether or not X exceeds the value X_END. If so, execution terminates at step 750, and the desired angle of rotation is given by the variable X_ANGLE. Otherwise, execution continues by advancing to step 760, which initializes to zero the variable D for the running sum in Equation 1 above.

At step 770 all of the pixel locations within the contour of the picture that were identified at step 710 are marked as being unprocessed. In addition, a specific pixel location, P, is selected as an initial location for processing. At step 780 P is marked as being processed. At step 790 the variable L_SMALLEST is initialized to a very large positive value. This ensures that the first value of the variable L calculated below is less than L_SMALLEST, and thus accepted.

At step 800 a box, B, is considered as being oriented in the direction of angle X relative to the borders of the scanner bed. This is the box 550 from FIG. 5, generated by rotating reference box 540 by an angle X about its center. Recall that reference box 540 was chosen large enough so as to ensure that box B encloses the entire contour of the picture.

The four sides of box B are marked as unprocessed, and at step 810 a specific side, S, is selected as an initial side for processing. At step 820, S is marked as being processed. At step 830 the distance, L, between pixel location P and side S is calculated, preferably based on Equation 2 above. At step 840 a determination is made as to whether or not L is smaller than L_SMALLEST. This is done in order to choose the smallest of the four distances from P to each of the four sides of box B, in order to computer the term $\partial(p, B(X))$ from Equation 1 above. If L is smaller than L_SMALLEST, then at step 850 L_SMALLEST is set to L, and the flow of execution advances to step 860. If L is not smaller than L_SMALLEST, then step 850 is by-passed, and the flow of execution advances directly from step 840 to step 860. As mentioned hereinabove, the first time the determination of step 840 is made, L is less than L_SMALLEST, since L_SMALLEST was initialized to a very large positive value at step 790.

At step 860 a determination is made whether there remain any unprocessed sides S of box B. If so, the flow of execution returns to step 820. If not, then the calculation of L_SMALLEST is complete, and L_SMALLEST is equal to the term $\partial(p,B(X))$ from Equation 1 above. At step 870 this term is added cumulatively to the running sum variable D. At step 880 a determination is made whether or not there remain any unprocessed pixel locations within the contour of the picture. If so, then control returns to step 750. If not, then all of the pixel locations within the outermost edges of the picture have been accounted for in the sum D(X) from Equation 1, and hence the variable D equals this sum.

The flow of execution then advances to step 890. At step 890 a determination is made as to whether or not D is less than D_SMALLEST. If not, the flow of execution advances to step 900 where the orientation angle is incremented by an amount DX, and from there the flow of execution returns to step 740. Otherwise, step 810 is executed, which sets the angle of rotation, X_ANGLE, to X, and sets D_SMALLEST to D. D_SMALLEST thus represents the smallest value of D currently produced by the search, and X_ANGLE represents the angle of orientation that produced this value of D. As mentioned hereinabove, the first time the determination of step 890 is made, D is less than D_SMALLEST, since D_SMALLEST was initialized to a very large positive value at step 720.

Various well-known search techniques can be used to determine the angle X_ANGLE that produces the smallest value of D(X). Although the search technique presented in FIG. 7 is an exhaustive technique, in alternative embodiments, other search techniques may be used, such as binary search or numerical techniques such as gradient methods.

In a preferred embodiment of the present invention a search for the angle of rotation is made by varying X in units of one degree from 0° to 90° or from 0° to −90°. The decision as to whether to search in the direction of positive or negative angles is made by initially selecting a small angle of rotation in one angular direction. It this causes the value of D(X) to increase, then the search is made in the opposite direction. Otherwise, if this causes the value of D(X) to decrease, then the search is made in the same direction. Moreover, since most people are right-handed and since right-handed people tend to rotate the picture clockwise when placing it on the scanner bed, the positive angular direction from 0° to 90° is the more probable one to give rise to the picture's angle of rotation. As such, in a preferred embodiment of the present invention, the initial angle of rotation is selected in the positive angular direction. In any event the largest number of directions to search through does not exceed 180, since 180 degrees spans all of the angles between −90° and +90° in units of one degree.

Regarding the method illustrated in FIG. 7, an advantage of using Equation 2, which computes the distances between pixel location P and side S for each angle of rotation X, based on the corresponding distances for reference box 540 (FIG. 5), is that the terms sin(X) and cos(X) appearing in Equation 2 can be computed once and stored in a table, obviating the need to compute them repeatedly. Once such a table is available, the calculations embodied in Equation 2 are simple additions and multiplications, which can be performed very quickly.

The following computer listing of software in the C++ programming language implements the flowchart of FIG. 7. The method RotationEstimate proceeds by first invoking BarycentricBoundingBox to calculate the reference box 540 (FIG. 5). It then invokes InitializeDistanceEdges to calculate the value of D(X) from Equation 2 above for the reference box; i.e., for the case when X=0. The running variable angle, stored in a variable named "angle," is initialized to zero, and the minimum value of D(X), stored in a variable named "distance," is initialized to D(0). The variable angle is incremented in units of RADIANT_STEP and the value of D(X) is calculated for X=angle. As long as D(X) continues to decrease (and the angle is less than 90°), the method continues to search over additional positive angles X. As soon as D(X) begins to increase, the method stops and returns the previous value of X as the estimated angle of rotation. In case D(X) increases at the first positive value of X, the method searches over negative values of X instead.

```
bool PSmartScanHighRes::RotationEstimate(
        const PIntRectangle& cropArea, PEdgeIterator* edges,
        float* rowCenter, float* columnCenter, float*
rotateAngle)
{
if ((cropArea.Area( ) == 0)||(edges->Size( ) == 0)) return false;
const float PId2=float(PI/2.0);
*rowCenter = *columnCenter = *rotateAngle = 0.0;
PFloatRectangle boundingBox(BarycentricBoundingBox(cropArea, edges,
```

-continued

```
                rowCenter,
columnCenter));
float rotationCenterRow = float(boundingBox.Top( ) +
        boundingBox.Height( )/2.0);
float rotationCenterColumn = float(boundingBox.Left( ) +
        boundingBox.Width( )/2.0);
PEdgeIterator new_edge;
float distanceO = InitializeDistanceEdges(edges &new_edge,
        boundingBox);
float newDistance = distance0, distance = distance0;
float angle = 0.0;
sint32 iteration = 0;
while (((newDistance < distance) [DIST_EQUAL(newDistance, distance))
&& (angle <= PId2))
{
  angle += float(RADIANT_STEP); iteration++;
  distance = newDistance;
  newDistance = Distance(&new_edge, boundingBox, rotationCenterRow,
        rotationCenterColumn, angle);
}
iteration--; angle -= float(RADIANT_STEP);
if ((iteration == 0) || (angle>PId2))
{
  angle = 0.0; distance = newDistance = distance0;
  while (((newDistance <distance) ||
        DIST_EQUAL(newDistance, distance)) && (angle >= -PId2))
  {
    angle -= RADIANT_STEP;
    distance = newDistance;
    newDistance = Distance(&new_edge, boundingBox,
        rotationCenterRow, rotationCenterColumn,
angle);
  }
}
iteration--; angle -= float(RADIANT_STEP);
if (angle<-PId2) return false;
*rotateAngle = angle;
return true;
}
```

Once the angle of rotation of the picture is identified, the photo kiosk can display a corrected image of the picture by rotating the scanned image in the direction opposite to its rotation angle, so that it appears oriented correctly in the kiosk display, and aligned with the kiosk display axes. This correction can be accomplished by either modifying the scanned image data, or by preserving the scanned image data and simply including the angle of rotation as part of the image data as described hereinbelow.

A photo kiosk may represent a scanned image internally in the Flashpix image format. FLASHPIX is a trademark of the Digital Imaging Group. A reference for Flashpix is the document "Flashpix Format Specification," ©1996, 1997, Eastman Kodak Company, the contents of which are hereby incorporated by reference.

The Flashpix image format allows for the inclusion of meta-data. Meta-data is auxiliary data to the image, such as data describing the creator, the contents, the copyright, the date and time created, the date and time last modified, the camera information and the scanner information. Meta-data can also include parameters for transformations to be applied to the image, such as rotations and scaling, general affine transformations, contrast adjustments and color space transformations. When displaying a Flashpix image, a Flashpix viewer must check for the presence of such transformations. If they are present within the Flashpix file, the viewer must apply them to the portion of the image being viewed.

As mentioned above, a photo kiosk may provide the consumer with hard copy or soft copy photo products. If the photo kiosk uses the Flashpix image format internally, then the kiosk performs the transformations embedded within the image file prior to displaying the image on the kiosk display and prior to printing out a hard copy photo product. For soft copy products, the Flashpix image file would be delivered to the consumer with the transformation data embedded within the file, in which case the consumer would need to have a Flashpix viewer in his home or office computer in order to properly display or print his photo product.

Multiple Scans

The present invention can be used to automatically generate multiple images when multiple pictures are placed on a scanner bed together. Regions of interest and angles of rotation can be determined for each of the pictures independently.

In order to apply the various techniques described hereinabove, the present invention operates by first scanning an area of the scanner bed containing all of the pictures therewithin, to produce a single scanned digital image, and then individually isolating the pictures within the scanned image. In a preferred embodiment, this is accomplished by identifying areas of pixel locations within the scanned image that bound each of the individual pictures, and then determining the contours of each individual picture within the respective bounding areas.

To find bounding areas of pixel locations within the scanned image for each of the pictures, the present invention first applies edge detection to the scanned image, in order to identify the edges of all of the pictures together within the scanned image. The present invention then applies a "blob growing" algorithm as described in detail hereinbelow. A "blob" is a connected group of pixel locations. A blob is initialized by choosing the group to be a small set of pixel locations, known to be contained entirely within a single one of the pictures. In a preferred embodiment of the present invention blobs are initialized as small circular sets of pixel locations, centered at locations within the scanned image where there are large densities of edges. This ensures that each blob is initially contained within a single one of the pictures.

A blob "grows" by expanding outwards. For example, initially a blob could be a circular set of pixel locations, and the growing could be implemented by inclusion of additional pixel locations as the set expands radially outward. In a preferred embodiment of the present invention, blobs grow by following edges that impinge upon their outer boundary. That is, given a current blob shape, if an edge point (i.e., a pixel location belonging to an edge) is found on the boundary of the blob, then the blob is expanded outwards in the direction of the edge. The growth process continues until there are no edge points on the boundary of the blob.

Blobs do not typically grow symmetrically in all directions. Blob growth can appear to be random. Even if a blob is initialized to be a circular set of pixel locations, its shape changes as it grows, and its shape is typically not circular nor oval-shaped nor even convex at any stage other than the initial stage.

Several blobs located at different parts of the scanned image are initialized and grown simultaneously, in order to take all of the pictures into consideration together in determining each of their individual bounding areas. Two blobs that grow in such a way that they intersect are coalesced into a single blob.

Figure 8:
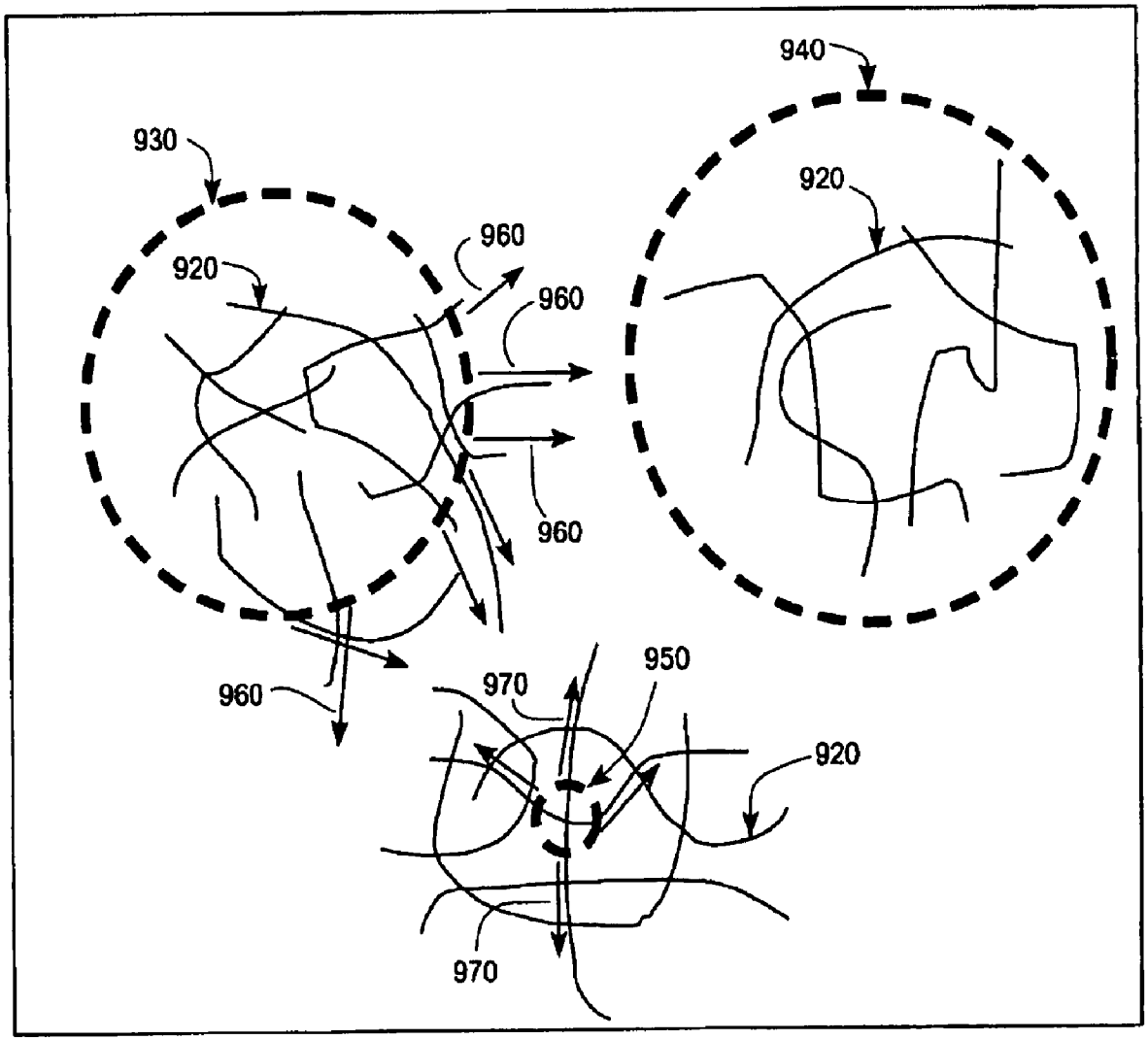
FIG. 8 is a simplified illustration of how blobs of pixel locations grow in accordance with a preferred embodiment of the present invention.

Reference is now made to FIG. 8, which is a simplified illustration of how blobs of pixel locations grow in accordance with a preferred embodiment of the present invention. Many edges 920 of images of pictures within a scanned image 925 are shown. Also shown are three blobs 930, 940 and 950 of pixel locations, currently having a circular shape. The boundary of blob 930 intersects seven of the edges 920. The vectors 960 indicate the outward directions of the intersecting edges. Blob 930 grows by expanding along the vectors 960.

The boundary of blob 940 does not intersect any edges, and as such blob 940 does not grow. The boundary of blob 950 intersects four of the edges 920. The vectors 970 indicate the outward directions of the intersecting edges. Blob 950 grows by expanding along the vectors 970.

Provided that the pictures in the scanner bed do not overlap, it is expected that the blobs will dynamically grow and coalesce until each blob contains a single entire picture within it. At that point, the blobs constitute the desired bounding areas of pixel locations.

If a single picture contains multiple disjoint objects within it, it may happen that multiple blobs are generated within such a picture, each blob bounding one of the disjoint objects. This is undesirable, since the purpose of the blobs is to bound an entire picture, and not just an object within a picture.

To overcome this undesirable result, the present invention operates by calculating a "separation" between two blobs, and coalescing two blobs together if the separation between them is smaller than a prescribed threshold. Thus blobs within the same picture will be combined if they are close enough together. Examples for measures of separation between blobs include the shortest distance between the blobs, or the area in a section between the blobs.

Figure 9:
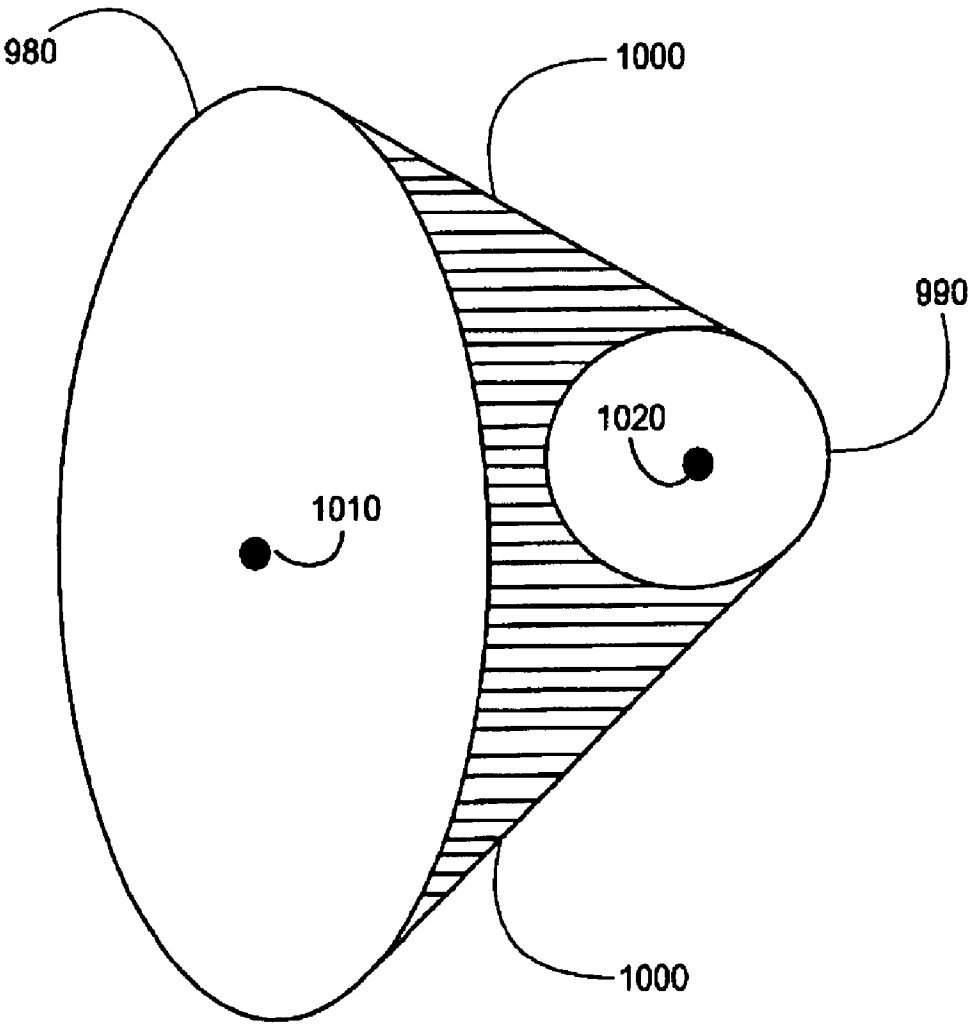
FIG. 9 is a simplified illustration for measurement of the separation between two blobs in accordance with a preferred embodiment of the present invention.

Reference is now made to FIG. 9, which is a simplified illustration of measurement of separation between two blobs in accordance with a preferred embodiment of the present invention. Shown in FIG. 9 are two blobs 980 and 990. Lines 1000 are drawn to complete a convex hull of the two blobs. Specifically, lines 1000 are each supporting lines for blobs 980 and 990. A supporting line for a blob has the property that it touches the blob, but the entire blob lies on one side of it. The hatched area between blobs 980 and 990 and within their convex hull is used for a measure of the separation between the two blobs.

A supporting line 1000 for blobs 980 and 990 can be computer generated by initializing a line connecting the centroids 1010 and 1020 of the two blobs 980 and 990, respectively. The left endpoint of the line is moved upward, with the right endpoint being held fixed, until the line no longer intersects blob 980. The right endpoint is subsequently moved upward, with the left endpoint being held fixed, until the line no longer intersects blob 990, at which point the line connecting the left and right endpoints is a supporting line. Similarly, a second supporting line for blobs 980 and 990 can be computer generated by repeating the above algorithm with the endpoints moving downward rather than upward.

When the generation of the blobs is complete, and the blobs no longer grow nor coalesce, the present invention uses the bounding areas of pixel locations corresponding to each blob to process each picture individually, as described above with reference to single scanned pictures. Specifically, for the variable box size embodiment, a search for the angle of rotation is conducted according to the flowchart in FIG. 3. For the fixed box size embodiment, the contours of the pictures are first determined by moving inwards from each blob towards the picture contained therewithin, one pixel at a time until an edge pixel location is found. Then, from the contours of the pictures, a search for the angle of rotation is conducted according to the flowchart in FIG. 7.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims.

Accordingly, the specification and drawings are to be regarded in an illustrative rather than a restrictive sense.

What is claimed is:

1. A method for determining the orientation of an image of a picture within a scanned image, comprising the steps of:

locating in the scanned image a contour of the image of the picture;

determining a plurality of bounding boxes confining the contour of the image of the picture;

selecting one of the plurality of bounding boxes that is substantially aligned with the contour of the image of the picture; and calculating an angle of rotation of the picture based on the selected bounding box.

2. The method of claim 1 and also including the step of applying edge detection to the scanned image, to locate edges of the image of the picture.

3. The method of claim 2 wherein the edge detection includes use of a Gaussian filter.

4. The method of claim 2 wherein the edge detection includes use of a Laplace filter.

5. The method of claim 2 wherein the edge detection includes use of a Laplacian of Gaussian filter.

6. The method of claim 2 and also including the step of identifying a bounding area of pixel locations that surrounds the image of the picture.

7. The method of claim 6 and also including the step of pre-scanning the picture at a low resolution to obtain a pre-scanned image, and wherein the pre-scanned image is used to identify the bounding area of pixel locations.

8. The method of claim 6 wherein said locating step comprises locating pixel locations situated at edges of the image of the picture and within the bounding area that are nearest to the border of the bounding area.

9. The method of claim 1 wherein each of the plurality of bounding boxes is associated with an angle, and wherein the positioning angle is the angle associated with the selected bounding box.

10. The method of claim 1 wherein said determining step comprises:

providing a reference box; and rotating the reference box about its center through multiple angles of rotation.

11. The method of claim 10 wherein said providing step comprises:

finding a region that bounds the contour of the image of the picture; and generating a box that encloses within it a circle, the circle being large enough to enclose the region.

12. The method of claim 11 wherein the center of the circle is coincident with the center of the reference box.

13. The method of claim 11 wherein the center of the reference box is coincident with the centroid of the image of the picture.

14. The method of claim 1 wherein said selecting step includes:

determining for each of the bounding boxes an average distance between the bounding box and the contour of the image of the picture; and choosing a bounding box for which the average distance between the chosen bounding box and the contour of the image of the picture is small as compared to the respective average distances between others of the plurality of bounding boxes and the contour of the image of the picture.

15. The method of claim 14 wherein said choosing step includes choosing a bounding box for which the average distance between the bounding box and the contour of the image of the picture is smallest among the respective average distances between the plurality of bounding boxes and the contour of the image of the picture.

16. A method for operating a scanner, comprising:

detecting that a user has placed a plurality of pictures in arbitrary orientations on a scanner bed of the scanner;

scanning the plurality of pictures to generate a scanned image containing a plurality of images of the pictures; and automatically determining an orientation of at least one of the images of the pictures relative to the scanner bed using the scanned image;

applying edge detection to the scanned image to locate edges of the plurality of images of the pictures, and identifying bounding areas of pixel locations for each image of a picture from among the plurality of images of pictures, each bounding area surrounding one image of a picture from among the plurality of images of pictures, such that identifying bounding areas includes, initializing a plurality of expandable groups of pixel locations;

expanding each of the expandable groups of pixel locations until none of the pixel locations on its boundary are situated at edges.

17. The method of claim 16 wherein the edge detection includes use of a Gaussian filter.

18. The method of claim 16 wherein the edge detection includes use of a Laplace filter.

19. The method of claim 16 wherein the edge detection includes use of a Laplacian of Gaussian filter.

20. The method of claim 16 and also including the step of pre-scanning the plurality of pictures at a low resolution to obtain a pre-scanned image, and wherein the pre-scanned image is used to identify the bounding areas.

21. The method of claim 16 further comprising the step of coalescing two expandable groups of pixel locations when they overlap as a result of said expanding step.

22. The method of claim 16 further comprising the steps of:

determining a separation between two expandable groups of pixel locations; and coalescing the two expandable groups of pixel locations when their separation is smaller than a prescribed threshold.

23. A method for operating a scanner, comprising:

detecting that a user has placed a plurality of pictures in arbitrary orientations on a scanner bed of the scanner;

scanning the plurality of pictures to generate a scanned image containing a plurality of images of the pictures;

automatically determining an orientation of at least one of the images of the pictures relative to the scanner bed using the scanned image;

applying edge detection to the scanned image to locate edges of the plurality of images of the pictures, and identifying bounding areas of pixel locations for each image of a picture from among the plurality of images of pictures, each bounding area surrounding one image of a picture from among the plurality of images of pictures, wherein said automatically determining the orientation comprises, for each image of a picture from among the plurality of images of pictures, the steps of:

detecting a contour of the image of the picture;

determining a plurality of bounding boxes enclosing the contour of the image of the picture;

selecting one of the plurality of bounding boxes that is substantially aligned with the contour of the image of the picture; and calculating an angle of rotation of the picture based on the selected bounding box.

24. The method of claim 23 wherein each of the plurality of bounding boxes is associated with an angle, and wherein the positioning angle is the angle associated with the selected bounding box.

25. The method of claim 23 wherein said detecting step comprises locating pixel locations situated at edges of the image of the picture and within the bounding area of the image of the picture that are nearest to the border of the bounding area.

26. The method of claim 23 wherein said determining step comprises:

providing a reference box; and rotating the reference box about its center through multiple angles of rotation.

27. The method of claim 26 wherein said providing step comprises:

finding a region that bounds the contour of the image of the picture; and generating a reference box that encloses within it a circle, the circle being large enough to enclose the region.

28. The method of claim 27 wherein the center of the circle is coincident with the center of the center of the reference box.

29. The method of claim 27 wherein the center of the box is coincident with the centroid of the picture.

30. The method of claim 23 wherein said selecting step includes: determining for each of the bounding boxes, an average distance between the bounding box and the contour of the image of the picture; and choosing a bounding box for which the average distance between the chosen bounding box and the contour of the image of the picture is small as compared to the respective average distances between others of the plurality of bounding boxes and the contour of the image of the picture.

31. The method of claim 30 wherein said choosing step includes choosing a bounding box for which the average distance between the chosen bounding box and the contour of the image of the picture is smallest among the respective average distances between the bounding boxes and the contour of the image of the picture.

32. A system for determining the orientation of an image of a picture within a scanned image, comprising:

an image processor locating in the scanned image a contour of the image of the picture;

a box generator determining a plurality of bounding boxes confining the contour of the image of the picture;

a box processor selecting one of the plurality of bounding boxes that is significantly aligned with the contour of the image of the picture; and an angle processor calculating an angle of rotation of the picture based on the selected bounding box.

*33. An apparatus, comprising:*

*means for locating in the scanned image a contour of the image of the picture;*

*means for determining one or more bounding boxes confining the contour of the image of the picture;*

*means for selecting one of the bounding boxes that is substantially aligned with the contour of the image of the picture; and*

*means for calculating an angle of rotation of the picture based at least in part on the selected bounding box.*

*34. An apparatus as claimed in claim 33, further comprising means for applying edge detection to the scanned image, to locate edges of the image of the picture.*

*35. An apparatus as claimed in claim 34, wherein said means for applying edge detection comprises a Gaussian filter.*

*36. An apparatus as claimed in claim 34, said means for applying edge detection comprises a Laplace filter.*

*37. An apparatus as claimed in of claim 34, said means for applying edge detection comprises a Laplacian of Gaussian filter.*

*38. An apparatus as claimed in claim 34, further comprising means for identifying a bounding area of pixel locations that surrounds the image of the picture.*

*39. An apparatus as claimed in claim 38, further comprising means for pre-scanning the picture at a low resolution to obtain a pre-scanned image, and wherein the pre-scanned image is used to identify the bounding area of pixel locations.*

*40. An apparatus as claimed in claim 38, said means for locating comprises means for locating pixel locations situated at edges of the image of the picture and within the bounding area that are nearest to the border of the bounding area.*

*41. An apparatus as claimed in claim 33, wherein one or more of the bounding boxes is associated with an angle, and wherein the positioning angle is the angle associated with the selected bounding box.*

*42. An apparatus as claimed in claim 33 wherein said means for determining comprises:*

*means for providing a reference box; and*

*means for rotating the reference box about its center through multiple angles of rotation.*

*43. An apparatus as claimed in claim 42 wherein said means for providing comprises:*

*means for finding a region that bounds the contour of the image of the picture; and*

*means for generating a box that encloses within it a circle, the circle being large enough to enclose the region.*

*44. An apparatus as claimed in claim 43, wherein the center of the circle is coincident with the center of the reference box.*

*45. An apparatus as claimed in claim 43, wherein the center of the reference box is coincident with the centroid of the image of the picture.*

*46. An apparatus as claimed in claim 33, said means for selecting comprising:*

*means for determining for one or more of the bounding boxes an average distance between the bounding box and the contour of the image of the picture; and*

*means for choosing a bounding box for which the average distance between the chosen bounding box and the contour of the image of the picture is small as compared to the respective average distances between others of the plurality of bounding boxes and the contour of the image of the picture.*

*47. An apparatus as claimed in claim 46 wherein said means for choosing comprises means for choosing a bounding box for which the average distance between the bounding box and the contour of the image of the picture is smallest among the respective average distances between the one or more bounding boxes and the contour of the image of the picture.*

*48. An apparatus, comprising:*

*means for detecting that a user has placed one or more pictures in arbitrary orientations on a scanner bed of a scanner;*

*means for scanning the one or more pictures to generate a scanned image containing one or more images of the pictures; and*

*means for determining an orientation of at least one of the images of the pictures relative to the scanner bed using the scanned image;*

*means for applying edge detection to the scanned image to locate edges of the one or more images of the pictures, and*

*means for identifying bounding areas of pixel locations for one or more image of a picture from among the one or more images of pictures, one or more bounding area surrounding one image of a picture from among the one or more images of pictures, such that said means for identifying bounding areas comprises:*

*means for initializing one or more expandable groups of pixel locations;*

*means for expanding one or more of the expandable groups of pixel locations until none, or nearly none, of the pixel locations on its boundary are situated at edges.*

*49. An apparatus as claimed in claim 48, said means for applying edge detection comprising a Gaussian filter.*

*50. An apparatus as claimed in claim 48, said means for applying edge detection comprising a Laplace filter.*

*51. An apparatus as claimed in claim 48, said means for applying edge detection comprising a Laplacian of Gaussian filter.*

*52. An apparatus as claimed in claim 48, further comprising means for pre-scanning the one or more pictures at a lower resolution to obtain a pre-scanned image, and wherein the pre-scanned image is used to identify the bounding areas.*

*53. An apparatus as claimed in claim 48, further comprising means for coalescing two or more expandable groups of pixel locations when the two or more expandable groups at least partially overlap as a result of said means for expanding.*

*54. An apparatus as claimed in claim 48, further comprising:*

*means for determining a separation between two or more expandable groups of pixel locations; and*

*means for coalescing the two or more expandable groups of pixel locations when their separation is smaller than a prescribed threshold.*

*55. An apparatus, comprising:*

*means for detecting that a user has placed one or more pictures in arbitrary orientations on a scanner bed of the scanner;*

*means for scanning the one or more pictures to generate a scanned image containing one or more images of the pictures;*

*means for determining an orientation of at least one of the images of the pictures relative to the scanner bed using the scanned image;*

*means for applying edge detection to the scanned image to locate edges of the one or more images of the pictures, and*

*means for identifying bounding areas of pixel locations for one or more image of a picture from among the one or more images of pictures, one or more bounding area surrounding one image of a picture from among the one or more images of pictures, wherein said means for determining the orientation comprises:*

*means for detecting a contour of the image of the picture;*

*means for determining a one or more bounding boxes enclosing the contour of the image of the picture;*

*means for selecting one of the one or more bounding boxes that is substantially aligned with the contour of the image of the picture; and*

*means for calculating an angle of rotation of the picture based at least in part on the selected bounding box.*

*56. An apparatus as claimed in claim 55, wherein one or more of the bounding boxes is associated with an angle, and wherein the positioning angle is the angle associated with the selected bounding box.*

*57. An apparatus as claimed in claim 55, said means for detecting comprising means for locating pixel locations situated at edges of the image of the picture and within the bounding area of the image of the picture that are nearest to the border of the bounding area.*

*58. An apparatus as claimed in claim 55, said means for determining comprising:*

*means for providing a reference box; and*

*means for rotating the reference box about its center through multiple angles of rotation.*

*59. An apparatus as claimed in claim 58, said means for providing comprising:*

*means for finding a region that bounds the contour of the image of the picture; and*

*means for generating a reference box that encloses within it a circle, the circle being large enough to enclose the region.*

*60. An apparatus as claimed in claim 59, wherein the center of the circle is coincident with the center of the center of the reference box.*

*61. An apparatus as claimed in claim 59, wherein the center of the box is coincident with the centroid of the picture.*

*62. An apparatus as claimed in claim 55, said means for selecting comprising:*

*means for determining for one or more of the bounding boxes, an average distance between the bounding box and the contour of the image of the picture; and*

*means for choosing a bounding box for which the average distance between the chosen bounding box and the contour of the image of the picture is relatively small as compared to the respective average distances between others of the one or more bounding boxes and the contour of the image of the picture.*

*63. An apparatus as claimed in claim 62, said means for choosing comprising means for choosing a bounding box for which the average distance between the chosen bounding box and the contour of the image of the picture is smallest, or nearly smallest, among the respective average distances between the bounding boxes and the contour of the image of the picture.*

*64. An apparatus, comprising:*

*means for locating in a scanned image a contour of the image of a picture;*

*means for determining one or more bounding boxes confining the contour of the image of the picture;*

*means for selecting one or more of the bounding boxes that is significantly aligned with the contour of the image of the picture; and*

*means for calculating an angle of rotation of the picture based at least in part on the selected bounding box.*

* * * * *

UNITED STATES PATENT AND TRADEMARK OFFICE

CERTIFICATE OF CORRECTION

PATENT NO. : RE42,881 E
APPLICATION NO. : 11/521620
DATED : November 1, 2011
INVENTOR(S) : Vallmajo et al.

It is certified that error appears in the above-identified patent and that said Letters Patent is hereby corrected as shown below:

Column 1, line 10, below "Title" insert -- CROSS-REFERENCE TO RELATED APPLICATION --.

Column 39, line 25, in Claim 28, delete "coincident with the center of the center of the reference box." and insert -- coincident with the center of the reference box. --.

Column 40, line 6, in Claim 37, delete "*as claimed in of claim 34,*" and insert -- *as claimed in claim 34,* --.

Column 42, lines 30-31, in Claim 60, delete "*coincident with the center of the center of the reference box.*" and insert -- *coincident with the center of the reference box.* --.

Signed and Sealed this
Nineteenth Day of June, 2012

David J. Kappos

David J. Kappos
*Director of the United States Patent and Trademark Office*